United States Patent
Li et al.

(10) Patent No.: US 12,395,110 B2
(45) Date of Patent: Aug. 19, 2025

(54) MULTI-WINDING-MOTOR DRIVING SYSTEM, VARIABLE-FREQUENCY ELECTRIC DRIVING SYSTEM, PUMPING SYSTEM, FRACTURING DEVICE AND WELLSITE EQUIPMENT

(71) Applicant: YANTAI JEREH PETROLEUM EQUIPMENT & TECHNOLOGIES CO., LTD., Yantai (CN)

(72) Inventors: Shouzhe Li, Yantai (CN); Jifeng Zhong, Yantai (CN); Yuanjie Xie, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 71 days.

(21) Appl. No.: 18/315,888

(22) Filed: May 11, 2023

(65) Prior Publication Data
US 2023/0283215 A1 Sep. 7, 2023

Related U.S. Application Data

(63) Continuation of application No. PCT/CN2022/101882, filed on Jun. 28, 2022.

(30) Foreign Application Priority Data

Jan. 18, 2022 (CN) .......................... 202210053618.9

(51) Int. Cl.
*E21B 43/26* (2006.01)
*E21B 33/13* (2006.01)
(Continued)

(52) U.S. Cl.
CPC .......... *H02P 25/22* (2013.01); *E21B 43/2607* (2020.05); *F04B 17/03* (2013.01);
(Continued)

(58) Field of Classification Search
CPC ...... E21B 43/2607; E21B 33/13; F04B 17/03; F04B 49/00; F04B 2203/0202;
(Continued)

(56) References Cited

U.S. PATENT DOCUMENTS

2006/0274560 A1 12/2006 Rastogi et al.
2017/0244325 A1 8/2017 Carralero et al.
(Continued)

FOREIGN PATENT DOCUMENTS

CN 2684460 Y 3/2005
CN 2899282 Y 5/2007
(Continued)

OTHER PUBLICATIONS

International Preliminary Report on Patentability Chapter I for International Application No. PCT/CN2022/101882 mailed on Aug. 2, 2024.
(Continued)

*Primary Examiner* — Daniel P Stephenson
(74) *Attorney, Agent, or Firm* — Sheppard Mullin Richter & Hampton LLP

(57) ABSTRACT

A multi-winding-motor driving system includes a motor and a power unit. The motor has multi-branch windings independent from each other. The power unit includes a rectifier unit and a plurality of inverter units, wherein the inverter units correspond to the multi-branch windings of the motor one to one, and each of the inverter units supplies power to corresponding one branch of the multi-branch windings of the motor.

19 Claims, 20 Drawing Sheets

(51) Int. Cl.
  *F04B 17/03* (2006.01)
  *F04B 49/00* (2006.01)
  *G08B 21/18* (2006.01)
  *H02P 25/22* (2006.01)

(52) U.S. Cl.
  CPC ............... *E21B 33/13* (2013.01); *F04B 49/00* (2013.01); *G08B 21/187* (2013.01)

(58) Field of Classification Search
  CPC ............ F04B 2203/0201; F04B 49/065; F04B 2207/70; F04B 51/00; H02P 25/22; H02P 25/16
  See application file for complete search history.

(56) References Cited

U.S. PATENT DOCUMENTS

| | | | |
|---|---|---|---|
| 2019/0267910 A1 | 8/2019 | Milivojevic et al. | |
| 2021/0102451 A1 | 4/2021 | Robinson et al. | |
| 2023/0283215 A1* | 9/2023 | Li | F04B 9/02 166/53 |
| 2023/0332493 A1* | 10/2023 | Zhong | E21B 43/2607 |

FOREIGN PATENT DOCUMENTS

| | | | | |
|---|---|---|---|---|
| CN | 102957375 A | | 3/2013 | |
| CN | 103795323 A | | 5/2014 | |
| CN | 204089675 U | | 1/2015 | |
| CN | 104953806 A | | 9/2015 | |
| CN | 105207567 A | | 12/2015 | |
| CN | 205193194 U | | 4/2016 | |
| CN | 106712648 A | * | 5/2017 | |
| CN | 107896067 A | | 4/2018 | |
| CN | 108900136 A | | 11/2018 | |
| CN | 110513097 A | | 11/2019 | |
| CN | 111204433 A | * | 5/2020 | |
| CN | 112127863 A | * | 12/2020 | ............. E21B 43/26 |
| CN | 114553062 A | | 5/2022 | |
| CN | 114977970 A | | 8/2022 | |
| JP | 2011041471 A | | 2/2011 | |

OTHER PUBLICATIONS

International Preliminary Report on Patentability Chapter I for International Application No. PCT/CN2022/125638 mailed on Nov. 28, 2024.

Non-Final Office Action for U.S. Appl. No. 18/455,217 mailed on Mar. 27, 2025.

First Office Action for Chinese Application No. 202210053618.9 mailed on May 31, 2025.

First Office Action for Chinese Application No. 202210539846.7 mailed on Jun. 20, 2025.

Wang, "Oil Extraction Machinery", Textbook for Secondary Vocational Schools, Petroleum Industry Publishing House, Feb. 28, 2007.

Li et al., "Overview of Petroleum Drilling and Production Machinery", Jun. 30, 2011.

* cited by examiner

MULTI-WINDING-MOTOR DRIVING SYSTEM, VARIABLE-FREQUENCY ELECTRIC DRIVING SYSTEM, PUMPING SYSTEM, FRACTURING DEVICE AND WELLSITE EQUIPMENT

CROSS-REFERENCE TO RELATED APPLICATIONS

This application is a continuation application of International Patent Application No. PCT/CN2022/101882 filed Jun. 28, 2022, which claims priority and benefit of Chinese patent application No. 202210053618.9 filed with China National Intellectual Property Administration on Jan. 18, 2022. All of the above-referenced applications are hereby incorporated by reference in their entirety.

TECHNICAL FIELD

The invention relates to the field of oil and gas field fracturing, in particular to a multi-winding-motor driving system, a variable-frequency electric driving system, a pumping system, a fracturing device, and wellsite equipment.

BACKGROUND ART

Since the worldwide oil and gas production equipment is developing towards low energy consumption, low noise and low emission, the traditional fracturing device using a diesel engine as a power source has been replaced by an electric fracturing device using a motor as the power source. In the existing electric fracturing device or wellsite equipment containing for example a fracturing device, a pumping device or a cementing device, a transducer (i.e., frequency converter) is used to drive the motor, and the motor drives a plunger pump to work so as to pressurize, for example, fracturing fluid, cement slurry or pumping fluid and deliver it to the underground. According to a driving scheme commonly used for the motor, a power element (such as an inverting unit, or a combination of a rectifier unit and an inverting unit) in the transducer is electrically connected to the motor so as to provide a variable-frequency current to the motor, thus driving the motor. The existing problem is that even if the motor has multiple branches of coil windings, the multiple branches of coil windings of the motor as a whole are provided with the variable-frequency current. Therefore, if there was a fault in a branch(es) of coil windings of the motor, the whole motor would not work normally. In addition, since the transducer merely has a single power element (such as IGBT (insulated gate bipolar transistor)), the motor would not work normally once the power element had a fault.

Moreover, with respect to the existing electric fracturing device or the like, the output voltage of currently available power supply facilities is usually no less than 10 kV (for example, in China, the power supply voltage of a power distribution grid is mainly 10 kV/50 Hz; and in United States or the like, the voltage supplied by common generators is 13.8 kV/60 Hz), while the power element (such as IGBT, IGCT (integrated gate commutated transistor), diode, SCR (silicon controlled rectifier), GTR (giant transistor), GTO (gate turn-off transistor), IEGT (injection enhanced gate transistor), etc.) in the conventional transducers of the electric fracturing device or the like has a limited withstand voltage and current and thus cannot withstand the output of a high voltage and large current from the power supply facilities. That is to say, the power element cannot be directly connected to the power supply facilities to be used. Therefore, a transformer through which the voltage can be adjusted is needed. That is, as shown in FIG. 1(B), a conventional transducer is indirectly connected to a power supply facility by using a transformer through which a high output voltage (no less than 10 kV) of the power supply facility is reduced to a low input voltage (no more than 6.6 kV) of the conventional transducer, and a power element in the conventional transducer is electrically connected to a motor to drive the motor. Furthermore, as shown in FIG. 1(A), the existing electric fracturing device (electric fracturing device (1), electric fracturing device (2), electric fracturing device (3), . . . ) is electrically connected to a power supply facility via a transducer sleigh (transducer sleigh (1), transducer sleigh (2), . . . ), each of the transducer sleighs is provided with at least one transducer, and the number of the at least one transducer may correspond to the number of a plurality of electric fracturing devices driven by the transducer sleigh. Generally, since the transducer includes a transformer and thus has a large volume and weight, the transducer needs to be placed separately from the motor of the electric fracturing device. When the transducer and the motor are separated by a distance, many cables between the motor and the transducer are required, which need to be connected by the whole machine manufacturer or the on-site operators. Moreover, harmonic pollution leads to a large amount of heat generated in the cables, and the heat may be transmitted to the motor. In addition, harmonic pollution also directly leads to an additional power loss and heating of the motor. These facts result in aging of an insulation material of the motor, shortening of a service life of the motor, and an insufficient cooling capacity of the motor, so the motor is easy to be damaged. The numerous cables also result in the need of a large floor area and the complexity of equipment production or wellsite layout.

In the prior art, there is a case where the transformer is disposed outside the transducer. In this case, the transducer sleigh may include two parts of transformer(s) and transducer(s). In addition, in the prior art, there is also a case where a plurality of transducers share a transformer and/or a rectifier unit. In these cases, there are also problems caused by the presence of a transformer.

SUMMARY OF INVENTION

The invention has been developed in light of the technical issues as described above. One aspect of the invention is to provide a multi-winding-motor driving system. In the multi-winding-motor driving system, the motor has multi-branch coil windings independent from each other, and each of the multi-branch coil windings is driven by corresponding one of power units. Therefore, when a branch of coil windings fails, the multi-winding-motor driving system can still work, and thus the reliability is greatly improved. In addition, it is possible that the power unit may be disposed separately from the motor or may be at least partially integrated on the motor.

The embodiments disclosed herein also aim to provide a pumping system containing the multi-winding-motor driving system, a fracturing, pumping or cementing device containing the pumping system, as well as wellsite equipment containing the fracturing, pumping or cementing device.

Another aspect of the invention is to provide a variable-frequency electric driving system capable of canceling the transformer. The variable-frequency electric driving system includes a motor and a power unit directly electrically connected to a power supply system and driving the motor. Such a variable-frequency electric driving system solves various problems existing in the prior art due to the presence of a transformer. For example, since the power unit is directly electrically connected to the power supply system without using a transformer, its volume and weight are reduced and it can be integrated onto the motor.

The embodiments disclosed herein also aim to provide a pumping system containing the variable-frequency electric driving system, a fracturing, pumping or cementing device containing the pumping system, as well as wellsite equipment containing the fracturing, pumping or cementing device.

Technical Solutions to Problems

In order to achieve the above objectives, an embodiment of the invention provides a multi-winding-motor driving system, which may comprise: a motor having multi-branch windings independent from each other; and a power unit including a rectifier unit and a plurality of inverter units. Herein, the inverter units corresponds to the multi-branch windings of the motor one to one, and each of the inverter units supplies power to corresponding one branch of the multi-branch windings of the motor.

An embodiment of the invention provides a pumping system, which may comprise: the above-described multi-winding-motor driving system; and at least one plunger pump, the plunger pump is driven by the motor, and the plunger pump is integrally installed together with the multi-winding-motor driving system. Herein, a transmission output shaft of the motor may be directly mechanically connected to a transmission input shaft of the plunger pump, or a transmission output shaft of the motor may be indirectly mechanically connected to a transmission input shaft of the plunger pump through a clutch or a coupler.

An embodiment of the invention provides a fracturing device, which may comprise: the above-described pumping system; a feeding manifold arranged on one side of the plunger pump; a discharging manifold arranged on one end or two ends of the plunger pump; and a power supply source for supplying power to the fracturing device.

An embodiment of the invention provides wellsite equipment, which may comprise the above-described fracturing device. Working fluid may be fracturing fluid. The feeding manifold may supply the fracturing fluid into the plunger pump, the plunger pump pressurizes the fracturing fluid, and then the pressurized fracturing fluid is delivered through the discharging manifold to the underground so as to fracture the underground.

An embodiment of the invention provides wellsite equipment, which may comprise a pumping device, the feeding manifold, the discharging manifold and the power supply source. The pumping device includes the above-described pumping system. Working fluid may be pumping fluid. The feeding manifold may supply the pumping fluid into the plunger pump, the plunger pump pressurizes the pumping fluid, and then the pressurized pumping fluid is delivered through the discharging manifold down into a well so as to pump various downwell tools.

An embodiment of the invention provides wellsite equipment, which may comprise: a cementing device, the feeding manifold, the discharging manifold and the power supply source. The cementing device includes the above-described pumping system. Working fluid may be cement slurry. The feeding manifold may supply the cement slurry into the plunger pump, the plunger pump pressurizes the cement slurry, and then the pressurized cement slurry is delivered through the discharging manifold into a well so as to fix the well's wall.

In order to achieve the above objectives, an embodiment of the invention provides a variable-frequency electric driving system, which may comprise: a motor; and a power unit directly electrically connected to a power supply system and driving the motor. Herein, the power unit may include: a rectifier unit directly electrically connected to the power supply system; and an inverting unit electrically connected to the rectifier unit and driving the motor. The rectifier unit may use a three-phase rectifying circuit, an upper arm and a lower arm of each phase of the three-phase rectifying circuit are respectively composed of a rectifier module, and each of the rectifier modules includes a plurality of rectifiers in series.

Embodiments of the invention further provide a pumping system, a fracturing device, a cementing device and wellsite equipment including the above-described variable-frequency electric driving system.

Advantageous Effects of Invention

According to the multi-winding-motor driving system of the invention, the motor having multi-branch windings independent from each other is adopted, and the power unit in which the rectifier unit(s) and the inverter units are combined in a specific way to respectively drive different branches of windings of the motor is adopted. In this way, when a branch fails, the multi-winding-motor driving system can continue to work, and the reliability is greatly improved. Therefore, the multi-winding-motor driving system has advantages of high system efficiency and excellent performance.

In addition, according to the multi-winding-motor driving system of the invention, the phase-shifting transformer may be used to replace a transformer used in the conventional transducer. With the phase-shifting transformer, harmonic can be eliminated by a phase shift, and a required output voltage value may be obtained by adjusting the voltage. In a case where a transformer is not needed, the phase-shifting transformer can only play the role of phase-shifting.

In addition, according to the disclosed embodiments, since the rectifier unit with a structure in which voltage division can be implemented by a series connection may be adopted, an input cable of the power unit can be directly electrically connected to a power supply facility without via a transformer. In this way, it is possible to realize a high-voltage variable-frequency control in which a high voltage (in the disclosed embodiments, the high voltage is for example a voltage higher than 3 kV, etc.) mode, a variable frequency mode and an electric driving mode are integrally combined, it is possible to solve the problem of the prior art in which an output distance of a high-voltage transducer is limited and interference of an output cable occurs on surrounding equipment, and it is also possible to avoid a case where aging and even breakdown of motor's insulation material occurs due to an excessive spike of the motor' terminal voltage caused by long-distance level power supply. In addition, according to the disclosed embodiments, since the transformer is canceled, the weight and volume of the power unit are relatively small, therefore, the power unit can be integrated on the motor and an output cable of the power unit can be effectively shortened. As compared with a technical solution in which the conventional transducer must be placed separately from the motor, the disclosed embodiments save a space occupied by a whole machine layout and has the advantage of compact structure. In addition, according to the disclosed embodiments, it is also possible that the power unit has a part (such as the inverting unit) integrated on the motor and other parts (such as the rectifier unit, etc.) placed separately from the motor. In this way, not only the space occupied by the whole machine layout can be reduced, but also a balanced distribution of weight and space is taken into account so as to avoid a local overweight or oversize.

According to the multi-winding-motor driving system of the disclosed embodiments, it is also possible that a rectifier unit with a structure in which voltage division can be implemented by a series connection is adopted at the same time. Due to the multi-winding-motor, the problem is solved such that other branches can still operate when a branch fails. Due to the rectifier unit with a structure in which voltage division can be implemented by a series connection, the transformer in the transducer in the prior art can be canceled, and then the integration of the power unit and the motor can be realized.

Note that the effects described here are only illustrative and not restrictive, and the invention may have other effects.

EMBODIMENTS OF INVENTION

Figures 1A, 1B:
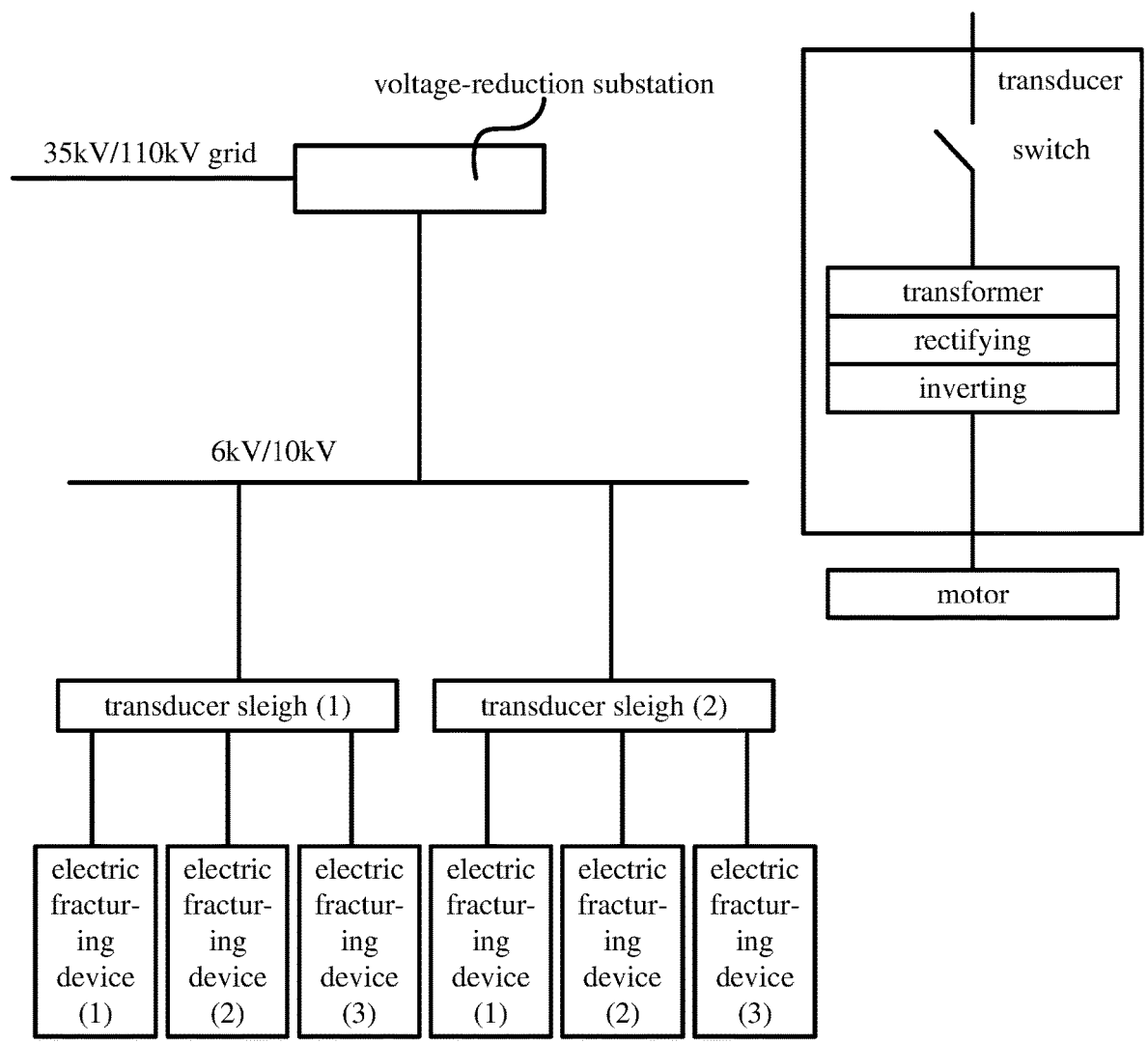
FIG. 1(A) illustrates a mode in which the existing electric fracturing device is electrically connected to a power supply facility via a transducer sleigh.
FIG. 1(B) illustrates a schematic block diagram of the configuration of the existing conventional transducer and a motor driven by the conventional transducer.

Embodiments will be described in detail below with reference to the accompanying drawings. The following description is some specific examples of the invention, but the invention is not limited to them. In addition, the invention is not limited to the arrangement, quantity, size, size ratio, etc. of the constituent elements shown in the drawings. Numbers 1, 2, 3, . . . , n are appended to the reference numerals of some components to indicate a plurality of such components, but the appended numbers will be omitted if there is no need to distinguish these components during the description.

Please note that the description will be given in the following order.

<1. A pumping system driven by a multi-winding-motor>
[1.1 a schematic configuration of the pumping system]
[1.2 a multi-winding-motor driving system]
[1.2.1 a first example of driving mode]
[1.2.2 a second example of driving mode]
[1.2.3 a third example of driving mode]
[1.2.4 a fourth example of driving mode]
[1.2.5 other examples]
[1.3 a multi-winding-motor driving system driving method]
[1.4 a variable-frequency electric driving system]
<2. A whole machine layout including a pumping system>
<3. A fracturing device including a pumping system>
[3.1 configuration of a fracturing device integrated by using a supporting frame]
[3.2 configuration of a fracturing device integrated by using a semi-trailer]
<4. Examples of a pumping device and a cementing device>
<5. Example of wellsite equipment>
<6. Example 1 of a control method of a multi-winding-motor>

<7. Example 2 of a control method of a multi-winding-motor>
<1. A Pumping System Driven by a Multi-Winding-Motor>

[1.1 A Schematic Configuration of an Example Pumping System]

Figure 2A:
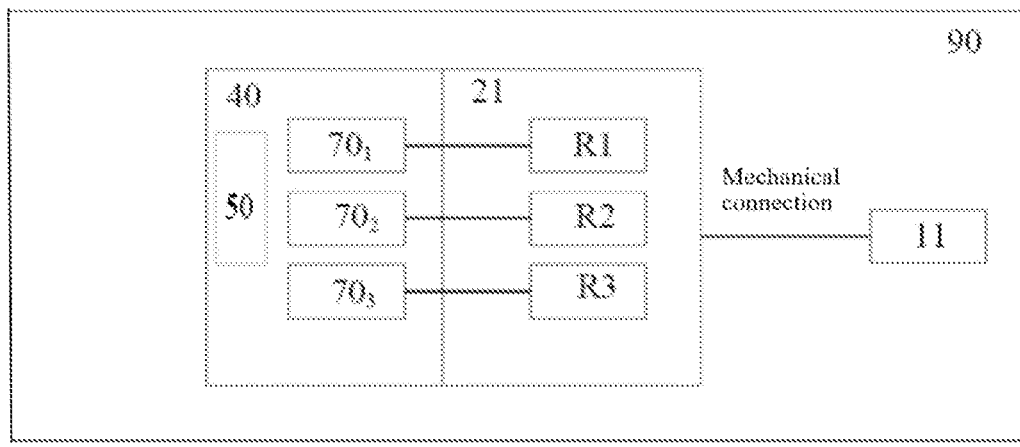
FIG. 2A illustrates a schematic block diagram of a pumping system according to an example embodiment.
Figure 2B:
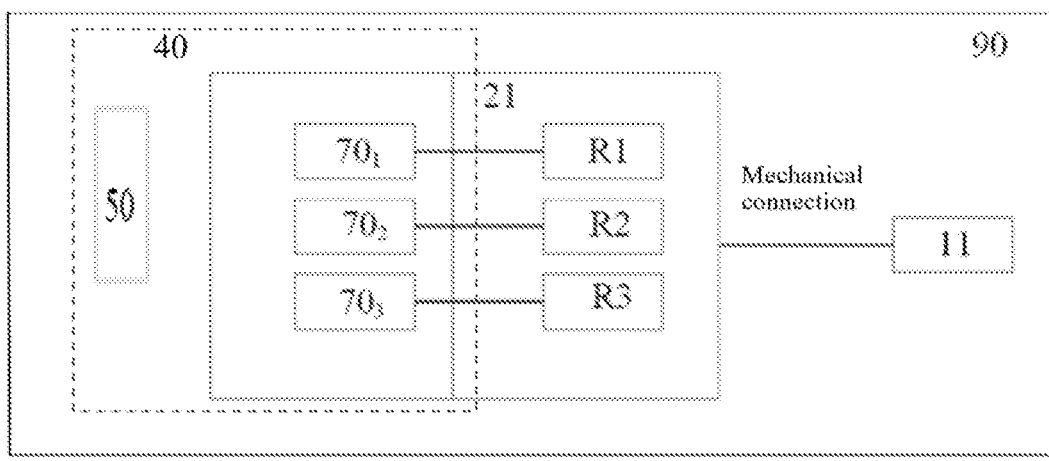
FIG. 2B illustrates a schematic block diagram of the pumping system according to an example embodiment.
Figure 2C:
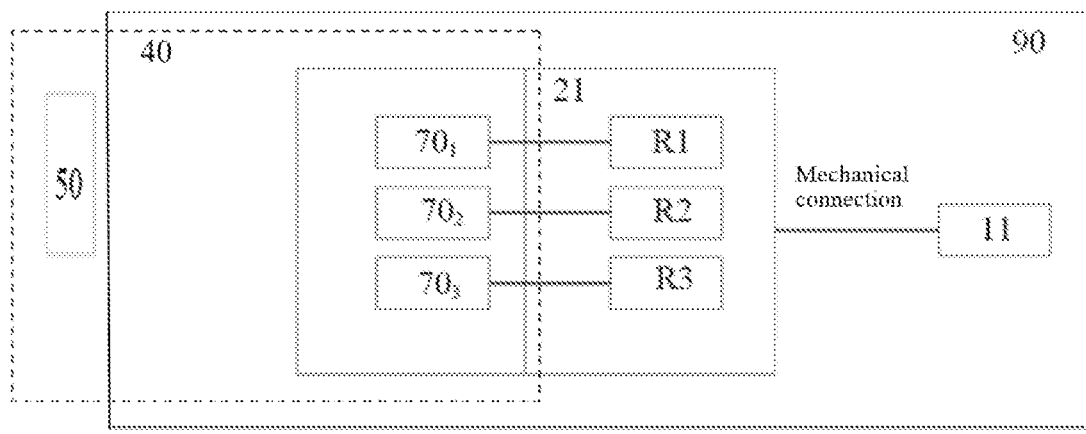
FIG. 2C illustrates a schematic block diagram of the pumping system according to an example embodiment.

Firstly, a schematic configuration of a pumping system driven by a multi-winding-motor will be described. FIGS. 2A to 2C illustrate schematic block diagrams of the first to third examples of the pumping system 90 according to the first embodiment. The pumping system 90 includes a multi-winding-motor driving system and a plunger pump 11 driven by the multi-winding-motor driving system. The multi-winding-motor driving system includes a power unit 40 and a motor 21. In the multi-winding-motor driving system, the output cable of the power unit 40 is electrically connected with a power input terminal of the motor 21 to drive the motor 21 such that the motor's speed is adjustable. The transmission output shaft of the motor 21 is mechanically connected with the transmission input shaft of plunger pump 11. Driven by the motor 21, the plunger of the plunger pump 11 moves back and forth in a cylinder to change the volume of a working cavity in which a working fluid is sealed, so as to realize the suction and pressurization of the working fluid and discharge the pressurized working fluid to the outside.

[1.2 A Multi-Winding-Motor Driving System]

Figure 3:
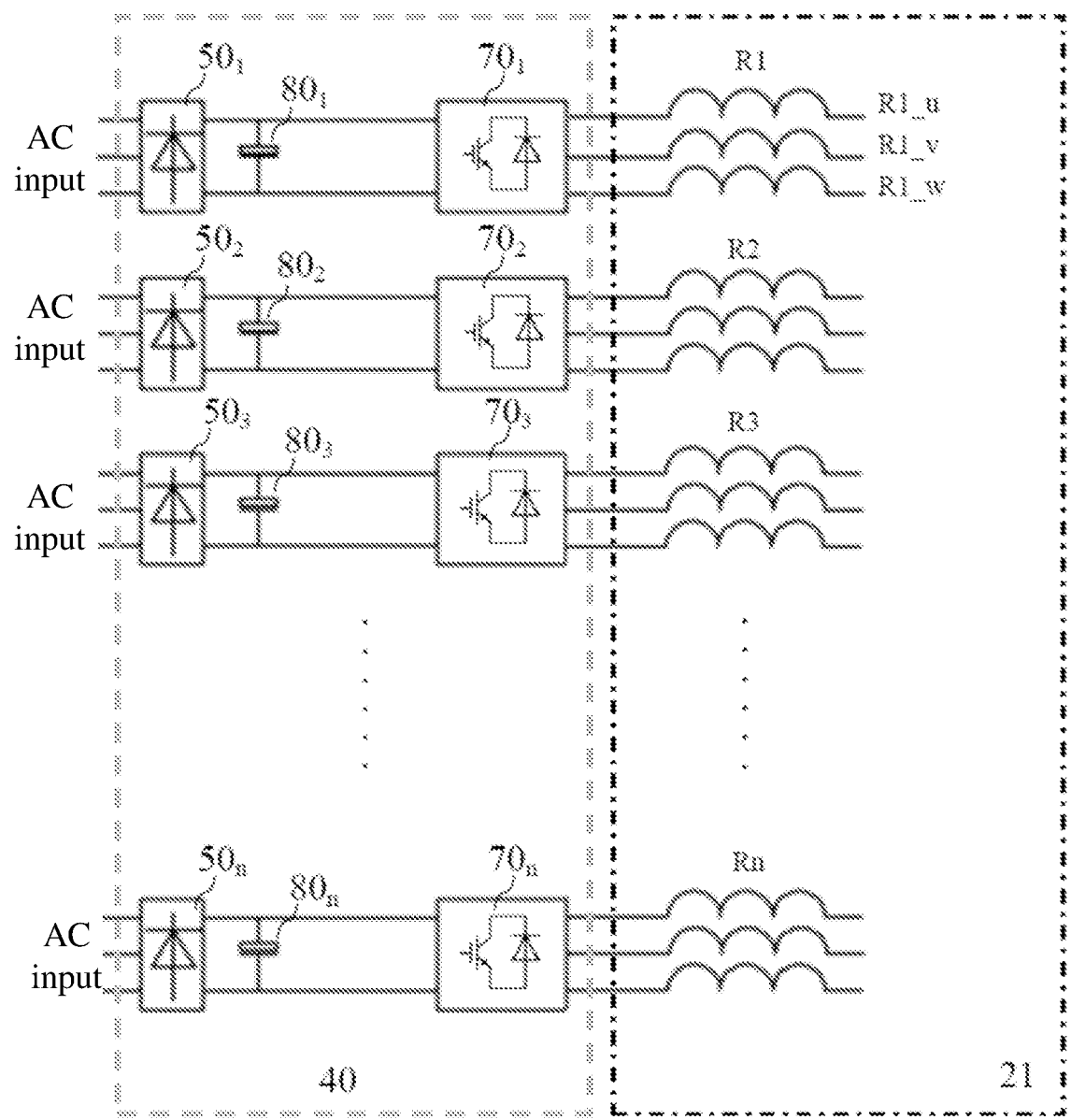
FIG. 3 illustrates a multi-winding-motor driving system in the pumping system according to an example embodiment.

In various multi-winding-motor driving systems used in the pumping system shown in FIGS. 2A to 2C, the motor 21 is a multi-winding-motor which has multiple branches R1~Rn (n 2) of windings. The multiple branches of windings are insulated from each other, that is, different branches are independent from each other. For example, under a condition wherein power supply is three-phase AC (alternating current), each branch includes three-phase coil windings (for example, branch R1 includes three-phase coil windings $R1\_u$, $R1\_v$, $R1\_w$, as shown in FIG. 3 which will be described later).

Moreover, a plurality of inverter units $70_1$~$70_n$ (n≥2) are provided in the power unit 40. The inverter units $70_1$~$70_n$ are electrically connected with the branches R1~Rn of windings of the motor 21 respectively. The number of the inverter units 70 is consistent with the number of multiple branches of windings of the motor 21, so that the plurality of inverter units 70 of one power unit 40 are electrically connected with multiple branches of windings of one motor 21 one to one, so as to realize a separate drive for each branch. Although an example of n=3 is shown in FIGS. 2A to 2C (that is, the motor 21 has three branches R1 to R3 of windings independent from each other, and the power unit 40 has corresponding three inverter units $70_1$ to $70_3$), the invention is not limited thereto. In some embodiments, the number of the branches of windings of the motor and the number of the inverter units may be no less than 4.

According to the disclosed techniques, the multi-winding-motor driving system in the pumping system 90 adopts a multi-branch working structure with multiple branches being independent from each other between the power unit 40 and the motor 21, so that the pumping system has a certain redundancy ability. When a branch of windings of the motor 21 and/or one of the inverter units of the power unit 40 fails, the branch of the working structure containing the failed branch of windings and/or the failed inverting unit can be disconnected, and the pumping system can still operate without stopping. Since the pumping system can continue to work, the reliability is greatly improved. In addition, the multi-branch windings of the motor are driven by the plurality of inverter units of the power unit, respectively, therefore, the torque performance (rotation speed adjustment) of the pumping system is more stable, the efficiency is higher, and the generated harmonic pollution is lower.

In addition, in the above power unit 40, as an example, if AC is input, a rectifier unit 50 may further be provided. The rectifier unit 50 rectifies the received AC and inputs it to the inverter units 70. FIGS. 2A to 2C show examples in which one rectifier unit 50 is electrically connected to a plurality of inverter units 70, but the invention is not limited thereto. Two or more rectifier units 50 may be provided in one power unit 40, and each rectifier unit 50 may be electrically connected to at least one of the inverter units 70.

In some embodiments, the power unit 40 may be at least partially integrated and installed on the motor 21 to obtain a spatially optimized high-voltage variable-frequency integrated machine (for example, high-voltage variable-frequency integrated machine 412 which will be described later in FIGS. 9 to 11). In the first example shown in FIG. 2A, the inverter units 70 for constituting the power unit 40 are integrated on the motor 21. As shown in FIG. 2A, when the power unit 40 further includes the rectifier unit 50 and the rectifier unit 50 is also arranged inside the pumping system 90, the rectifier unit 50 may be integrated together with the inverter units 70 on the motor 21. The difference between the second example shown in FIG. 2B and the first example shown in FIG. 2A is that only the inverter units 70 of the power unit 40 are integrated on the motor 21, while the rectifier unit 50 is not integrated on the motor 21. The difference between the third example shown in FIG. 2C and the second example shown in FIG. 2B is that the rectifier unit 50 is not arranged inside the pumping system 90, but outside the pumping system 90. With the power unit 40 at least partially installed on the motor 21, the techniques can not only reduce the space occupied by the whole machine layout, but also take into account a balanced distribution of weight and space.

[1.2.1 A First Example of Driving Mode]

FIG. 3 illustrates a first example of a multi-winding-motor driving system in the pumping system according to the first embodiment. As shown in FIG. 3, the power unit 40 includes a plurality of inverter units $70_1$~$70_n$, and each of the inverter units 70 includes one or more inverters such as IGBT, IGCT, diode, SCR, GTO or IEGT or a combination thereof. In some embodiments, under the condition of AC input, the power unit 40 further includes a plurality of rectifier units $50_1$~$50_n$, and each rectifier unit 50 includes one or more rectifiers. In some embodiments, the power unit 40 may further include a plurality of capacitors $80_1$ to $80_n$. The number of rectifier units 50 and the number of capacitors 80 may be consistent with the number of inverter units 70. Therefore, the rectifier unit 50 and the inverter units 70 are electrically connected one to one. For example, the three-phase AC is respectively input to each of the rectifier units 50, rectified by the rectifier unit 50 and then input to the corresponding inverting unit 70, and then inverted by the inverting unit 70 and input to the input terminals of the three-phase coils (R_u, R_v, R_w) of the corresponding branch R of coil windings of the motor 21. The other terminals of the three-phase coils may be connected in a manner of a Y-shaped or delta connection.

Therefore, any branch among the multi-branch working structure between the power unit 40 and the motor 21 (in this example, the rectifier unit $50_1$, the capacitor $80_1$ and the inverting unit $70_1$ in the power unit 40 as well as the branch R1 of windings in the motor 21 constitute one branch of the working structure, and so on) works independently of other branches among the working structure. The first example can achieve the aforementioned effect that other branches of the working structure of the pumping system can continue to work when a branch of the working structure fails. In addition, in such a pumping system, the motor has low noise and high system efficiency and a low harmonic pollution is generated.

In some embodiments, the number of rectifier units 50 in FIG. 3 may not be consistent with the number of inverter units 70. For example, at least some of the rectifier units 50 may be shared, and the shared rectifier unit 50 may drive two or more inverter units 70.

[1.2.2 A Second Example of Driving Mode]

Figure 4A:
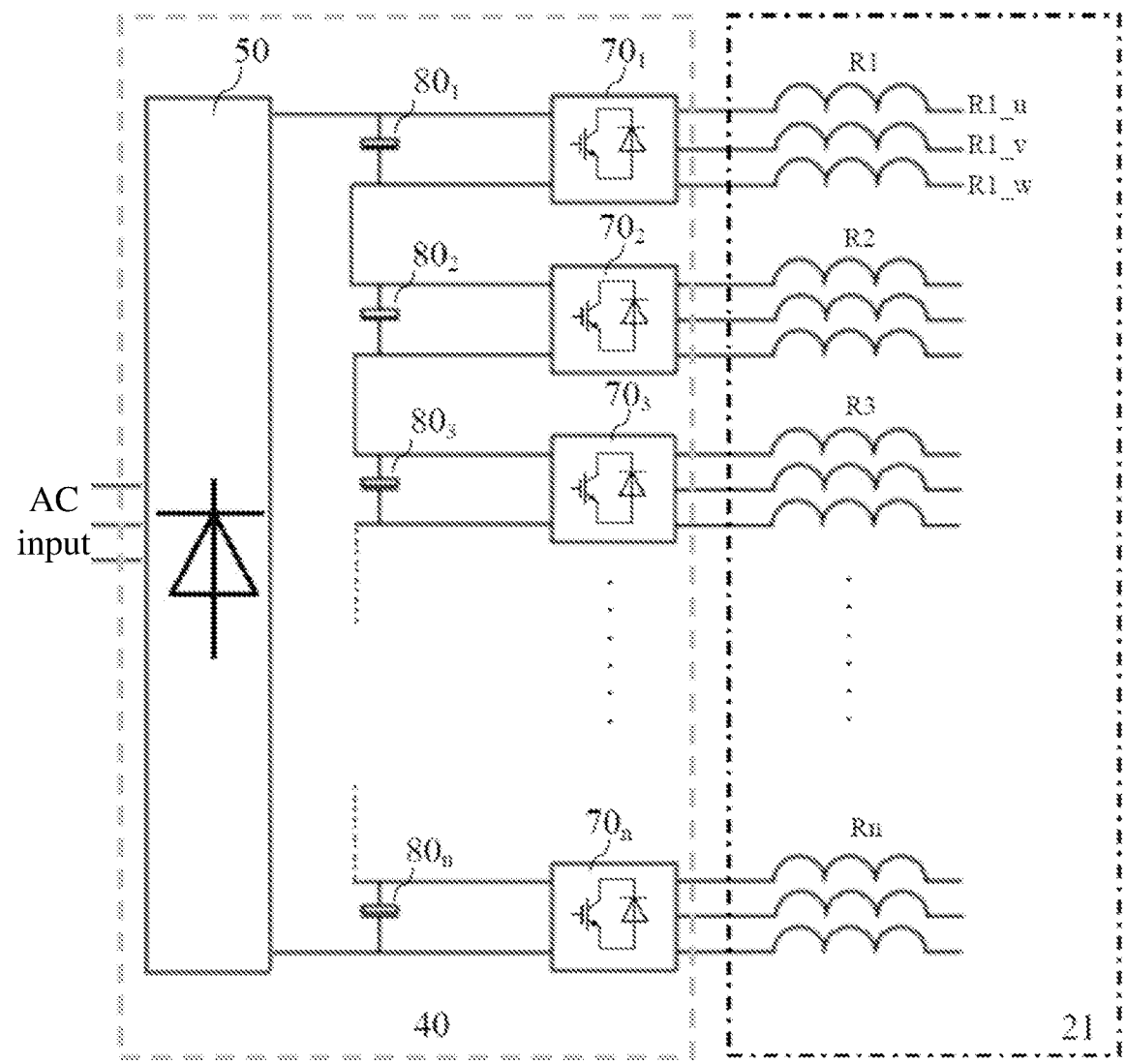
FIG. 4A illustrates a multi-winding-motor driving system in the pumping system according to an example embodiment.

FIG. 4A illustrates a second example of a multi-winding-motor driving system in the pumping system according to the first embodiment. The difference between the second example of the multi-winding-motor driving system shown in FIG. 4A and the first example shown in FIG. 3 is that the power unit 40 does not include a plurality of rectifier units, but uses only one rectifier unit 50, the rectifier unit 50 may include one or more rectifiers, and the rectifier unit 50 is electrically connected to a plurality of inverter units $70_1$~$70_n$. In this second example, the plurality of inverter units $70_1$ to $70_n$ are connected in series (for example, the cathode of the first inverting unit $70_1$ is connected to the anode of the second inverting unit $70_2$, and so on), the anode of the first inverting unit $70_1$ is connected to the positive output terminal of the rectifier unit 50, and the cathode of the last inverting unit $70_n$ is connected to the negative output terminal of the rectifier unit 50. In the second example, except that the rectifier unit 50 in the power unit 40 is a shared rectifier unit, any branch among the multi-branch working structure between the power unit 40 and the motor 21 (in this example, the capacitor $80_1$ and the inverting unit $70_1$ in the power unit 40 as well as the branch R1 of windings in the motor 21 constitute one branch of the working structure, and so on) works independently of other branches among the working structure. The configuration of the second example can also achieve the aforementioned effect that other branches of the working structure of the pumping system can continue to work when a branch of the working structure fails. In addition, the second example adopts the above configuration in which one rectifier unit 50 is shared, which saves the occupied space when multiple rectifier units are used, so that the volume and weight of the power unit 40 may be further reduced, and it facilitates to realize the power unit 40 at least partially integrally installed on the motor 21, or it benefits the whole machine layout.

Figure 4B:
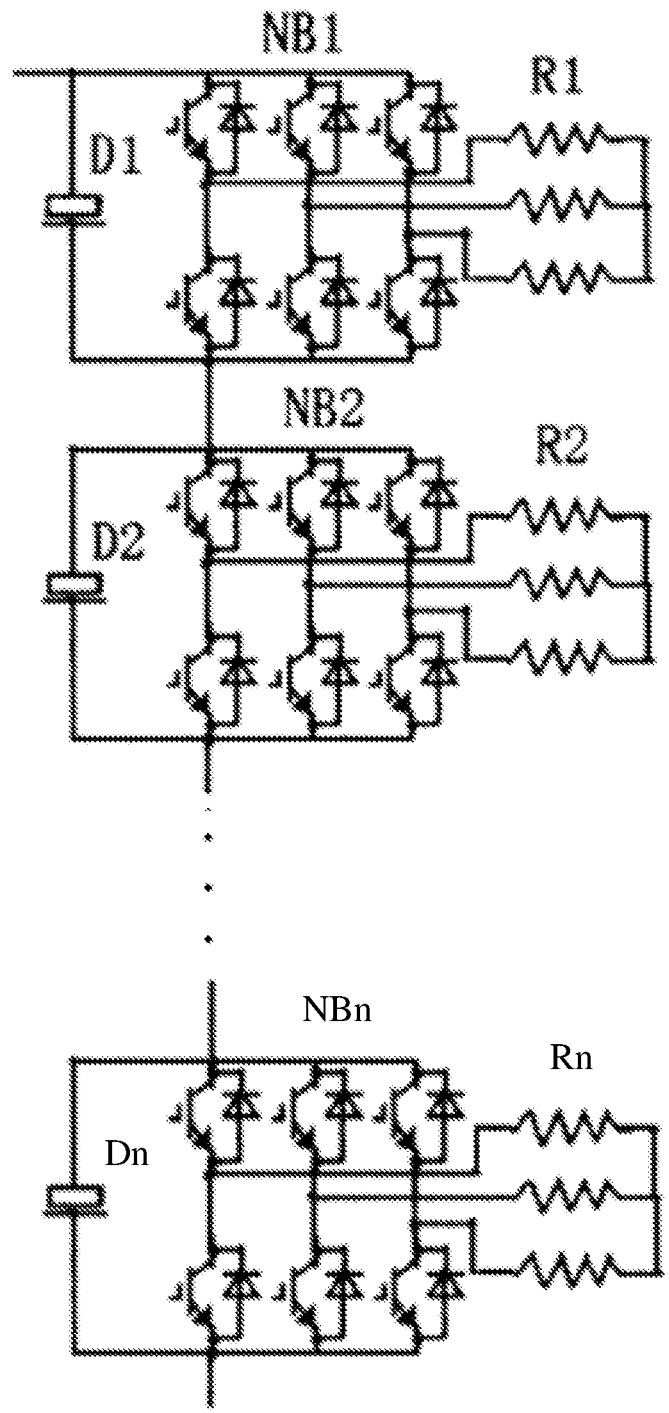
FIG. 4B illustrates a circuit diagram of the electrical connection between a plurality of inverter units and corresponding branches of windings of the motor in the multi-winding-motor driving system shown in FIG. 4A.
Figure 4C:
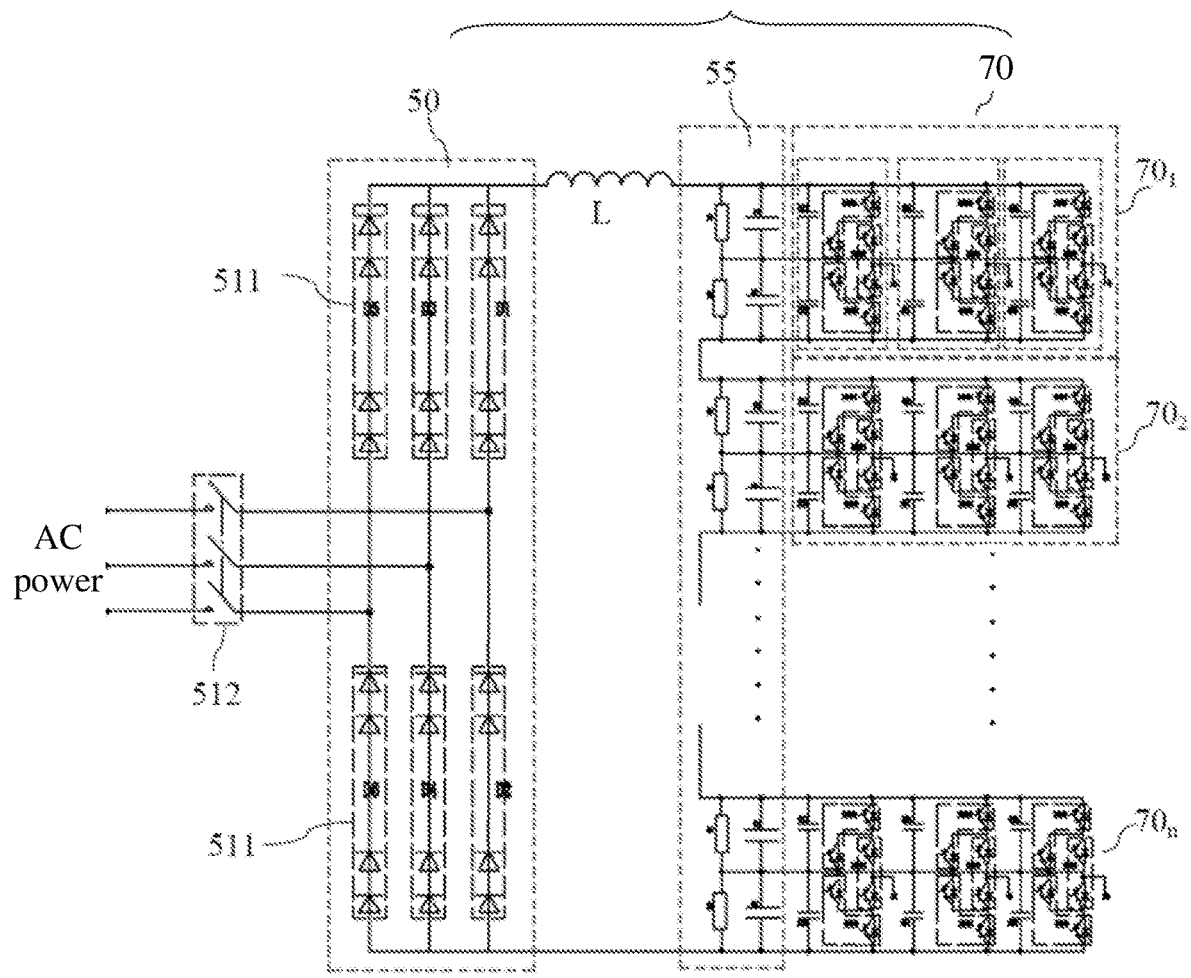
FIG. 4C illustrates a circuit diagram of the electrical connection between a rectifier unit and a plurality of inverter units in the multi-winding-motor driving system shown in FIG. 4A.
Figure 4D:
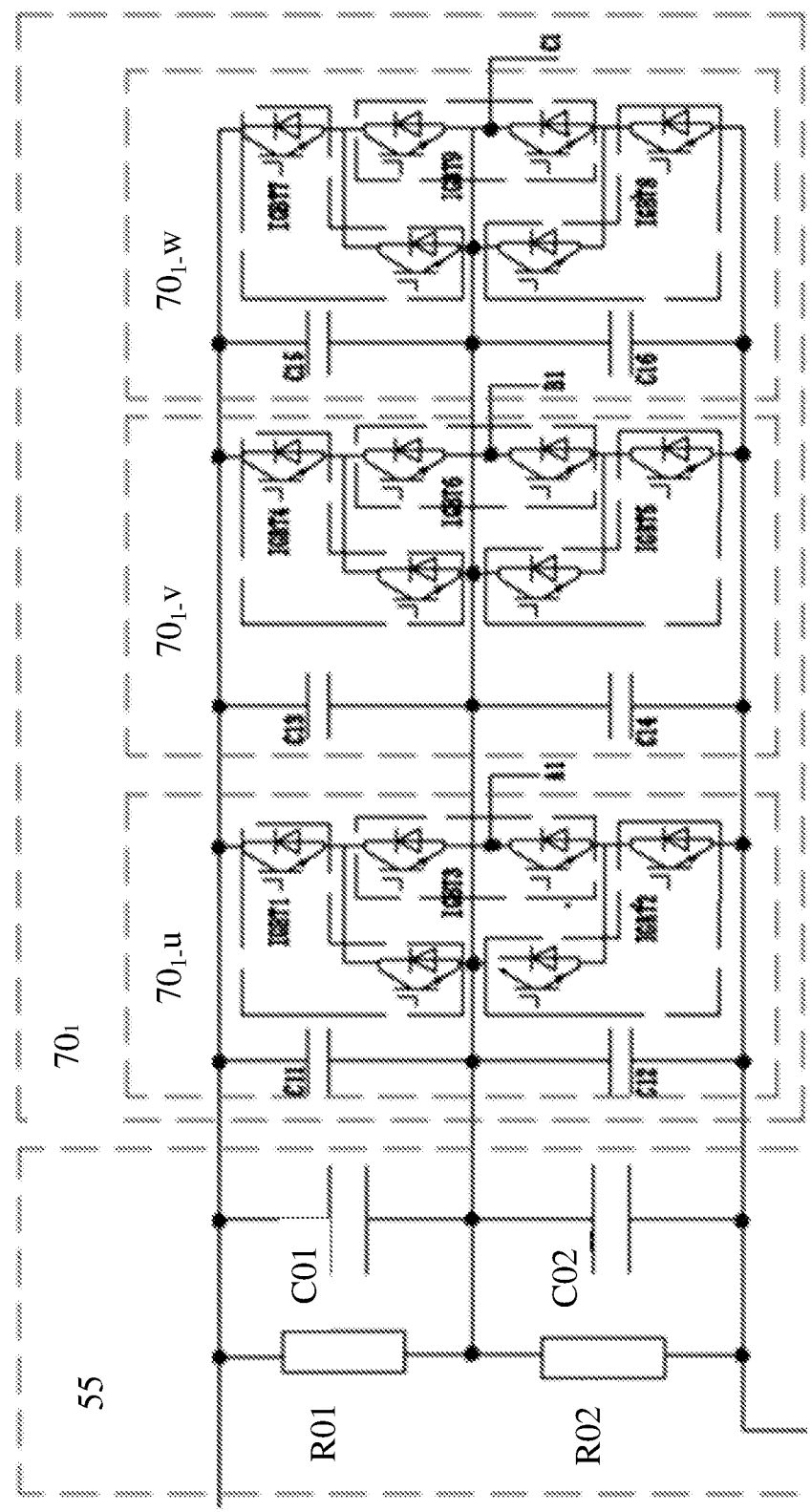
FIG. 4D illustrates a partial enlarged view of a filter unit and a inverting unit in FIG. 4C.

FIG. 4B illustrates a circuit diagram of the electrical connection between a plurality of inverter units in the multi-winding-motor driving system shown in FIG. 4A and the three-phase coils of the corresponding branches of windings of the motor. FIG. 4C illustrates a circuit diagram of the electrical connection between a rectifier unit and a plurality of inverter units in the multi-winding-motor driving system shown in FIG. 4A. FIG. 4D illustrates a partial enlarged view of a filter unit and a inverting unit in FIG. 4C.

In FIG. 4B, the filter capacitors D1~Dn shown schematically are equivalent to the above capacitors $80_1$~$80_n$, the inverters NB1~NBn shown schematically are equivalent to the above inverter units $70_1$~$70_n$, and R1~Rn are multi-branch windings independent from each other in the motor 21, and each branch of windings has three-phase coils. In each of the inverters NB1~NBn, a three-phase three-level inverting circuit is adopted. The upper arm and lower arm of each phase are composed of a triode and a diode. The output terminal of each phase is electrically connected to the input terminal of the corresponding phase of one branch of windings of the motor. The specific configuration of the inverting unit is not limited to the example of the inverter described here, and the inverters used in the inverter are not limited to the triodes and diodes and their numbers shown in the attached drawings.

The circuit of the power unit 40 shown in FIG. 4C includes a rectifier unit 50, a reactor L, a filter unit 55 and a plurality of inverter units $70_1$~$70_n$. The rectifier unit 50 adopts a three-phase rectifying circuit. The upper arm and the lower arm of each phase are respectively composed of a rectifier module 511. The input terminal of each phase is electrically connected to a corresponding output terminal of a power supply facility for providing AC via a three-phase switch 512. Each rectifier module 511 may include a plurality of rectifiers (such as rectifier diodes) in series. For example, the rectifier module 511 of the upper arm (the positive side) may include eight rectifier diodes in series (from bottom to top in FIG. 4C, the cathode of the first diode is connected to the anode of the second diode, and so on). The rectifier module 511 of the lower arm (the negative side) may also include eight rectifier diodes in series (from top to bottom in FIG. 4C, the anode of the first diode is connected to the cathode of the second diode, and so on). In each phase, the anode of the first diode in the rectifier module 511 in the upper arm and the cathode of the first diode in the rectifier module 511 in the lower arm are electrically connected to the input terminal of the phase. The cathode of the last diode in the rectifier module 511 in the upper arm is connected to the positive output terminal of the rectifier unit 50, and the anode of the last diode in the rectifier module 511 in the lower arm is connected to the negative output terminal of the rectifier unit 50.

Since the rectifier unit 50 in which multiple rectifiers are connected in series to realize voltage division is adopted in this example, different series stages may be selected according to the requirements of different output voltages. Therefore, the power unit 40 is not equipped with the transformer and has a smaller volume and weight than the transducer in the prior art using the transformer. The techniques improve integration so as to realize the spatial optimization of the whole machine layout. The specific configuration of the rectifier unit is not limited to the examples described here.

During operation, the rectifier unit 50 rectifies the three-phase AC input from the power supply facility and supplies it to each of the inverter units $70_1$~$70_n$ via a reactor L. As an example, the filter unit 55 is arranged between the rectifier unit 50 and the inverter units 70, which is used to filter the output voltage of the rectifier unit 50 so that the waveform of the output voltage is smoothed (deburred), and then supply it to each of the inverter units 70. In the filter unit 55, a filter circuit is provided corresponding to each of the inverter units 70. For example, as shown in FIG. 4D, the filter circuit corresponding to the inverting unit $70_1$ is composed of resistors R01 and R02 and capacitors C01 and C02.

Still with reference to FIG. 4D, the inverting unit $70_1$ will be described as an example, it adopts a three-phase ($70_1$_u, $70_1$_v and $70_1$_w) circuit. In one phase of branch circuit $70_1$_u among the three-phase circuit, two capacitors C11~C12 and three transistor modules IGBT1~IGBT3 are provided. In another phase of branch circuit $70_1$_v among the three-phase circuit, two capacitors C13~C14 and three transistor modules IGBT4~IGBT6 are provided. In the remaining phase of branch circuit $70_1$_w among the three-phase circuit, two capacitors C15~C16 and three transistor modules IGBT7~IGBT9 are provided. These three phases of branch circuit $70_1$_u. $70_1$_v and $70_1$_w have their respective output terminals A1, B1 and C1 electrically connected to an input terminal of corresponding one phase of the three-phase coils of the branch R1 of windings of the motor 21. The inverting unit $70_1$ converts the voltage after filtered by a corresponding filter circuit in the filter unit 55 into a controllable AC capable of driving the corresponding winding of the motor to operate. Other inverter units have a similar structure as above and their description will not be repeated. The inverting unit of the invention is not limited thereto, but can also adopt other suitable structures.

[1.2.3 A Third Example of Driving Mode]

Figure 5A:
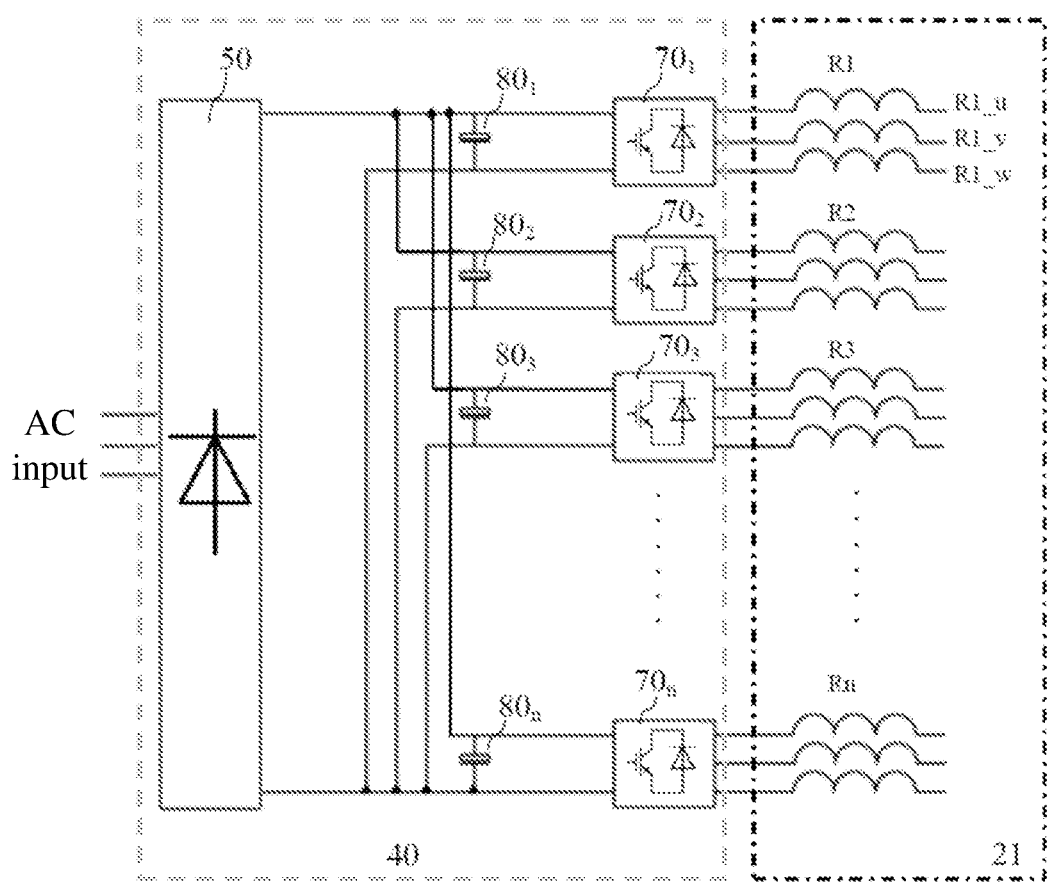
FIG. 5A illustrates a multi-winding-motor driving system in the pumping system according to an example embodiment.
Figure 5B:
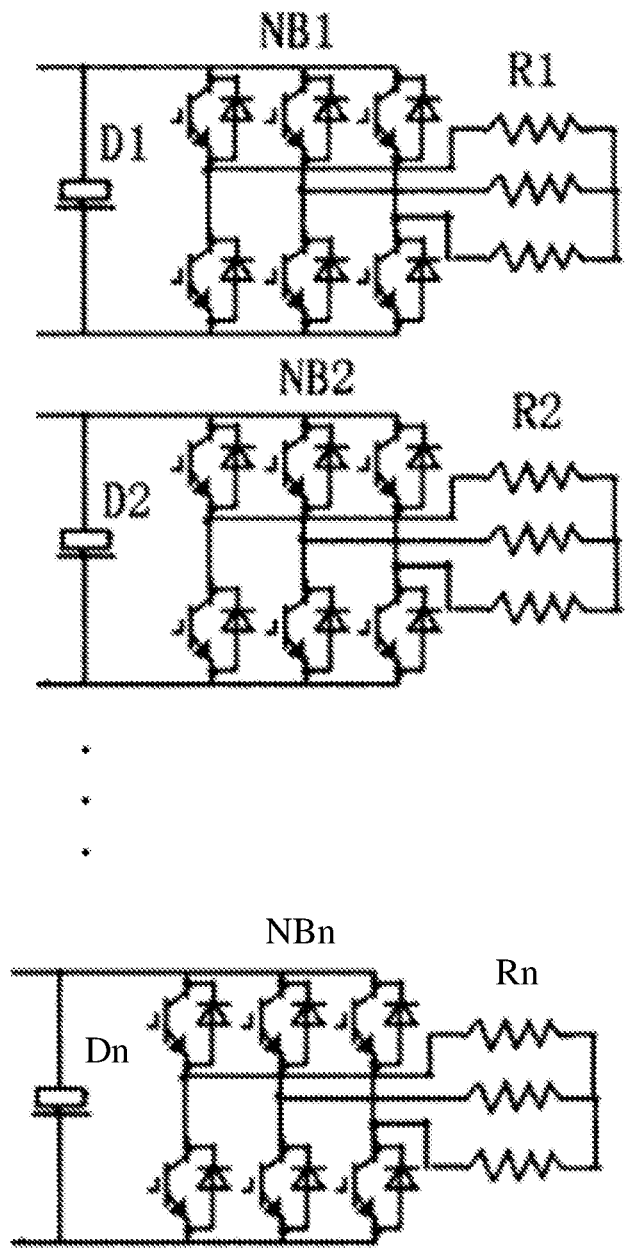
FIG. 5B illustrates a circuit diagram of the electrical connection between a plurality of inverter units and corresponding branches of windings of the motor in the multi-winding-motor driving system shown in FIG. 5A.
Figure 5C:
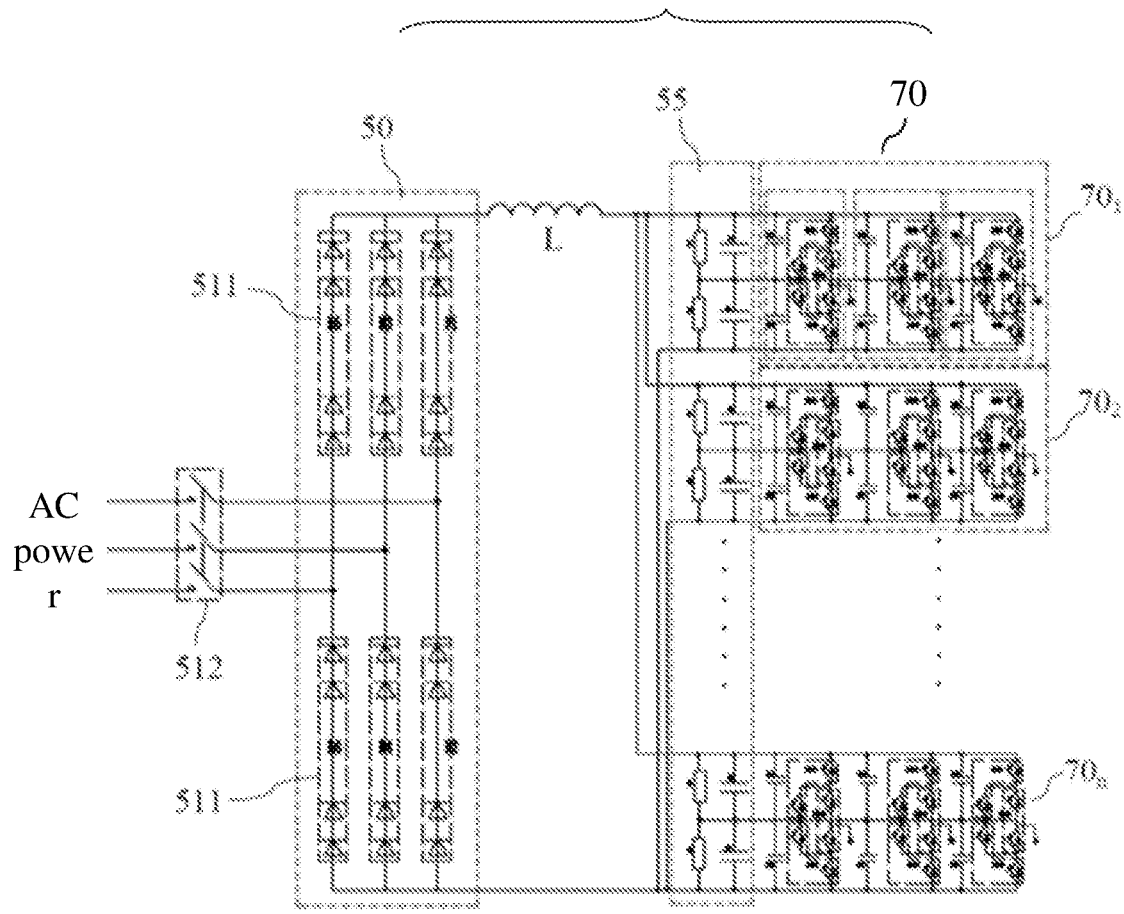
FIG. 5C illustrates a circuit diagram of the electrical connection between a rectifier unit and a plurality of inverter units in the multi-winding-motor driving system shown in FIG. 5A.

FIG. 5A illustrates a third example of a multi-winding-motor driving system in the pumping system according to the first embodiment. FIG. 5B illustrates a circuit diagram of the electrical connection between a plurality of inverter units and corresponding branches of windings of the motor in the multi-winding-motor driving system shown in FIG. 5A. FIG. 5C illustrates a circuit diagram of the electrical connection of a rectifier unit and a plurality of inverter units in the multi-winding-motor driving system shown in FIG. 5A. The difference between the third example of the multi-winding-motor driving system shown in FIGS. 5A to 5C and the second example shown in FIGS. 4A to 4C is that the plurality of inverter units $70_1$ to $70_n$ are not connected in series, but connected in parallel (for example, the anode of each of the inverter units $70_1$ to $70_n$ is connected to the positive output terminal of the rectifier unit 50, and the cathode of each of the inverter units $70_1$ to $70_n$ is connected to the negative output terminal of the rectifier unit 50). Other configurations are similar to those shown in the second example and will not be repeated.

[1.2.4 A Fourth Example of Driving Mode]

Figure 5D:
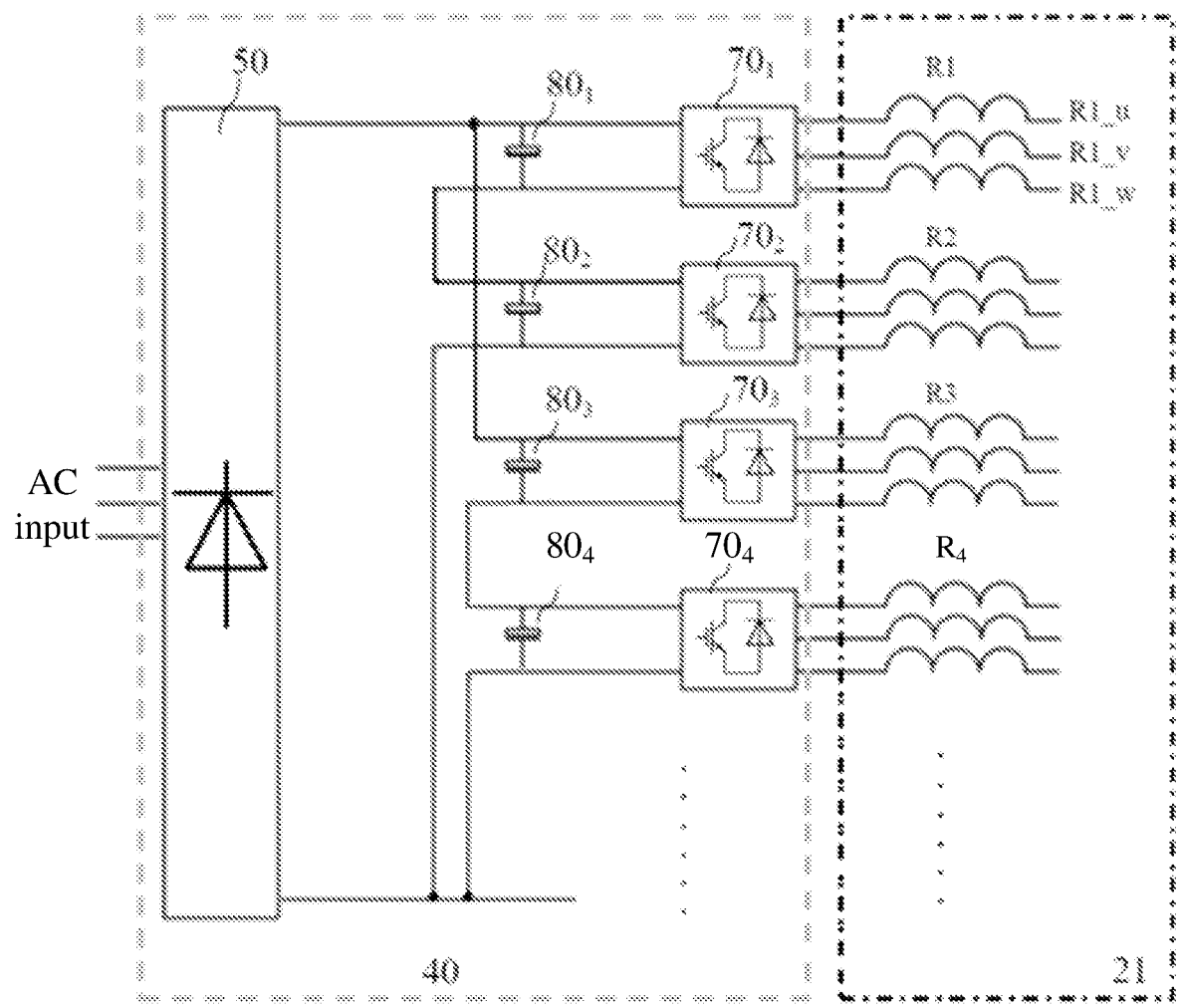
FIG. 5D illustrates a multi-winding-motor driving system in the pumping system according to an example embodiment.

A plurality of inverter units 70 in one power unit 40 may adopt a connection mode other than the series connection mode as shown in FIG. 4A and the parallel connection mode as shown in FIG. 5A. For example, FIG. 5D illustrates a fourth example of a multi-winding-motor driving system in a pumping system according to the first embodiment. In FIG. 5D, a plurality of inverter units 70 adopt a hybrid connection mode including both series connection and parallel connection. Specifically, in FIG. 5D, the first inverting unit $70_1$ and the second inverting unit $70_2$ are connected in series, the third inverting unit $70_3$ and the fourth inverting unit $70_4$ are connected in series, the series connection structure composed of the first inverting unit $70_1$ and the second inverting unit $70_2$ and the series connection structure composed of the third inverting unit $70_3$ and the fourth inverting unit $70_4$ are connected in parallel between the positive output terminal and the negative output terminal of the rectifier unit. FIG. 5D is only an example of a hybrid connection mode, and the invention is not limited thereto.

[1.2.5 Other Examples]

The technical contents described in the first to third examples of the pumping system and the first to fourth examples of the multi-winding-motor driving system may be combined with each other as needed and without contradiction. For example, in the example shown in FIG. 3 in which a plurality of rectifier units $50_1$ to $50_n$ are used, each of the rectifier units 50 may also adopt a configuration including the above rectifier module 511.

Figure 6:
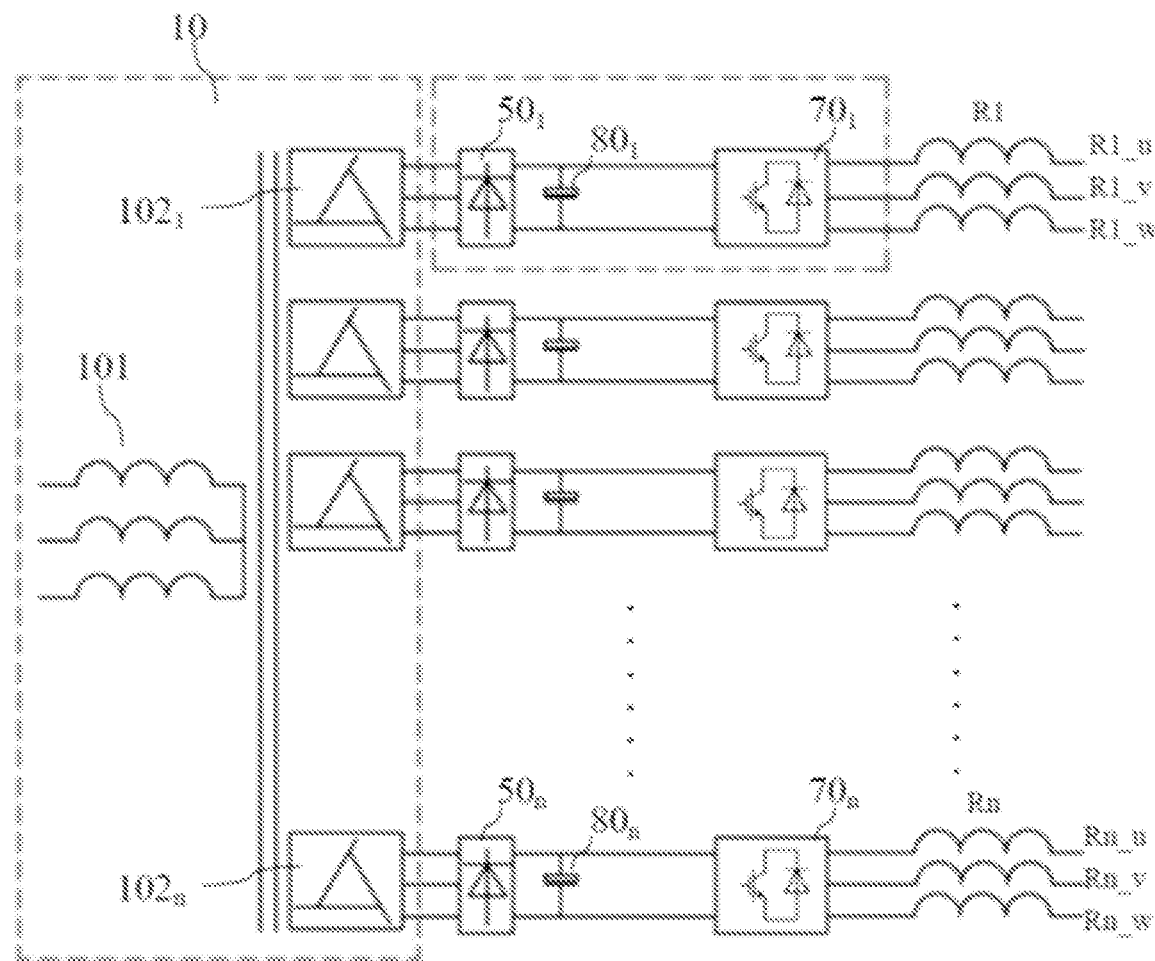
FIG. 6 illustrates a schematic block diagram of the pumping system according to an example embodiment, where a phase-shifting transformer is arranged on the input side of the rectifier unit of the multi-winding-motor driving system.

In addition, FIG. 6 illustrates a schematic block diagram of a fourth example of a pumping system according to the first embodiment. In the pumping system shown in FIG. 6, the difference of the multi-winding-motor driving system from the first example of the multi-winding-motor driving system shown in FIG. 3 is that a phase-shifting transformer 10 is further arranged upstream of the power unit 40 (at a power input side thereof). Here, the phase-shifting transformer 10 includes a primary windings 101 and a plurality of secondary windings $102_1$~$102_n$, and the phases of output voltages of the plurality of secondary windings $102_1$~$102_n$ are shifted with respect to each other at a certain interval. Each of the rectifier units $50_1$~$50_n$ in the power unit 40 is electrically connected to a corresponding one of the plurality of secondary windings $102_1$~$102_n$ of the phase-shifting transformer 10.

According to the embodiments, the phase-shifting transformer 10 is arranged on the power input side of the rectifier unit 50. On one hand, by changing a turns ratio of each of the secondary windings to the primary winding of the phase-shifting transformer 10, the purpose of voltage adjustment can be achieved. On the other hand, by means of the phase shift of the phase-shifting transformer 10, harmonics can be eliminated. In addition, by using the phase-shifting transformer 10, an electrical isolation between the rectifier unit and the power supply grid can further be realized.

[1.3 A Multi-Winding-Motor Driving Method]

The embodiments disclosed herein provide a multi-winding-motor driving method which comprises: providing a motor with multi-branch windings independent from each other; and providing a power unit including a combination of at least one rectifier unit and a plurality of inverter units, the number of the plurality of inverter units corresponds to that of the multi-branch windings of the motor one to one, and each of the inverter units is used to supply power to the corresponding one branch of the multi-branch windings of the motor respectively. Under the condition of DC (direct current) power supply, the rectifier unit may be omitted from the power unit.

In the multi-winding-motor driving method, the step of providing the power unit may include: providing a plurality of the rectifier units so that each of the rectifier units supplies power to one or more of the plurality of inverter units; or providing only one rectifier unit supplying power to the plurality of inverter units.

In the above multi-winding-motor driving method, it may further include: integrally installing the plurality of inverter units on the motor.

In the multi-winding-motor driving method, it may further include: integrally installing the rectifier unit(s) on the motor.

In the multi-winding-motor driving method, it may further include: providing a phase-shifting transformer on the input side of the rectifier units.

In the multi-winding-motor driving method, it may further include: providing filter capacitor(s) between the rectifier unit(s) and each of the plurality of inverter units.

In the above multi-winding-motor driving method, it may further include: forming a part of the rectifier unit by connecting a plurality of rectifiers in series.

In the above multi-winding-motor driving method, it may further include: connecting the plurality of inverter units in series, in parallel or in a series-parallel hybrid manner.

The multi-winding-motor driving method further includes: providing an alarm system, when a one branch of the multi-branch windings of the motor or one of the plurality of inverter units fails, the alarm system provides an alarm information; and/or providing a control system, when the condition in which the actually total output power of the plurality of inverter units of the power unit does not exceed k×P×(n−n1−n2−1)/n reaches a predetermined duration period, the control system selectively turns off the output of one of the plurality of inverter units, where k is the safety factor of the motor and k<1, P is the rated power of the motor, n is the number of the plurality of inverter units in the power unit (i.e., the number of multi-branch windings of the multi-winding-motor), n1 is the number of inverter units currently in OFF state, and n2 is the number of the currently failed (e.g. damaged) inverter units.

The multi-winding-motor driving method further includes: providing a display system or a voice system for displaying or broadcasting the alarm information.

The pumping system includes the above multi-winding-motor driving system or uses the above multi-winding-motor driving method, so it also has all the advantages brought by the multi-winding-motor driving system and driving method.

[1.4 A Variable-Frequency Electric Driving System]

In the first to fourth examples of driving mode described above, the special design of the rectifier unit(s) and the inverting unit(s) is shown. By using such a special design of the rectifier unit(s) and the inverting unit(s), a variable-frequency electric driving system can be constructed. The variable-frequency electric driving system may include: a motor; and a power unit directly electrically connected to a power supply system and driving the motor. The power unit includes the special design of the rectifier unit(s) and the inverting unit(s). In the power unit 40, at least one rectifier unit 50 and at least one inverter units 70 may be provided. As shown in FIG. 3, a plurality of rectifier units 50 which are arranged corresponding to a plurality of inverter units 70 one to one are provided. In some embodiments, as shown in FIGS. 4A, 5A and 5D, a rectifier unit 50 which may be electrically connected to a plurality of inverter units 70 is provided. In some embodiments, for example, when a plurality of rectifier units 50 are provided in the power unit 40 shown in FIG. 3, each of the rectifier unit 50 may be electrically connected to two or more inverter units 70. In addition, the two or more inverter units 70 electrically connected to a rectifier unit 50 may be connected in series, in parallel or in a series-parallel hybrid manner. The variable-frequency electric driving system is not limited to these examples.

In the variable-frequency electric driving system, no matter one or more than one rectifier unit 50 is provided in the power unit 40, each of the rectifier units 50 can adopt for example the three-phase rectifying circuit as shown in FIG. 4C, in which the upper arm and lower arm of each phase are respectively composed of a rectifier module 511, and each of the rectifier modules 511 may include a plurality of rectifiers (such as rectifier diodes) connected in series. The plurality of rectifiers connected in series can achieve the effect of voltage division, so that the rectifier unit 50 may be directly connected to a high-voltage power supply facility without via a transformer. In addition, in the variable-frequency electric driving system, when a plurality of inverter units 70 are provided and at least two of the inverter units 70 are connected in series, the effect of improving the voltage tolerance of the inverting unit 70 can also be realized by voltage division due to a series connection structure.

In the variable-frequency electric driving system, the motor may be a multi-winding-motor 21 with independent multi-branch coil windings (as shown in FIGS. 3, 4A, 5A and 5D) or a conventional motor. In the case of multi-winding-motor, each inverting unit of the variable-frequency electric driving system corresponds to each branch of coil windings of a multi-winding-motor respectively. In the case of conventional motor, each inverting unit in the variable-frequency electric driving system corresponds to each motor respectively. In either case, it can solve the problem that the variable-frequency electric driving system may be directly connected to the power supply system without via a transformer.

As an example, the variable-frequency electric driving system may be provided with a phase-shifting transformer which only plays the role of phase-shifting on the input side of the power unit.

The pumping system may include the above variable-frequency electric driving system, so it also has all the advantages brought by the variable-frequency electric driving system.

In the pumping system, no matter it includes a multi-winding-motor driving system provided with a multi-winding-motor, it includes a variable-frequency electric driving system canceling the transformer, or it adopts a technical solution obtained by containing a multi-winding-motor and canceling a transformer, the rectifier unit(s) and the inverter units can be integrated on the motor or not integrated on the motor. The rectifier unit(s) and the inverter units can be integrally installed together or placed separately. The rectifier unit(s) can be shared.

<2. A Whole Machine Layout Including a Pumping System>

Next, an example of the whole machine layout according to the second embodiment will be described, the whole machine layout containing the pumping system and its related power supply system and control system.

Figure 7A:
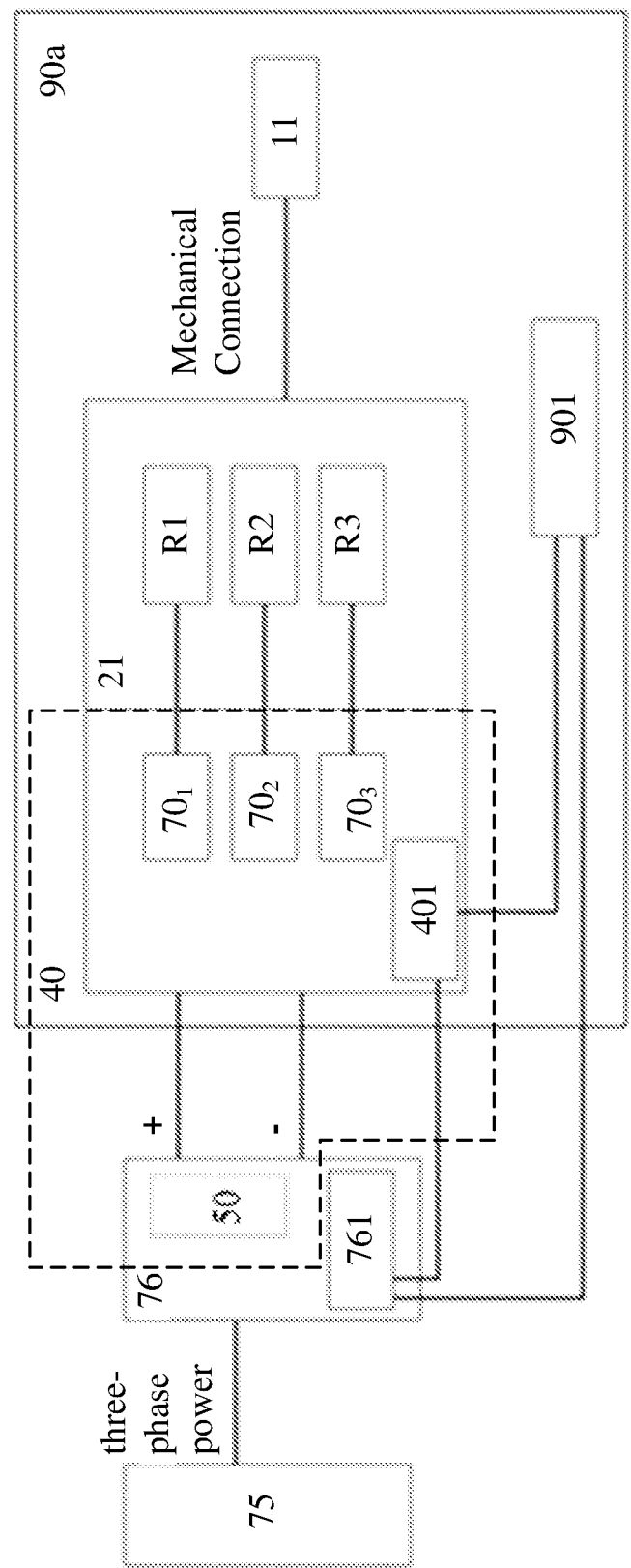
FIG. 7A illustrates a whole machine layout according to an example embodiment, the whole machine layout including the pumping system of the invention and a related power supply system and control system.

FIG. 7A illustrates a first example of a whole machine layout according to a second embodiment, which includes a pumping system 90a, a power distribution unit 76 and a power supply source 75. In the whole machine layout shown in FIG. 7A, the power distribution unit 76 is placed outside the pumping system 90a, and the pumping system 90a is electrically connected to the power supply source 75 via the power distribution unit 76. For example, the power supply source 75 provides three-phase AC to the power distribution unit 76. In addition, a power distribution control system 761 is provided in the power distribution unit 76.

The pumping system 90a includes a power unit 40, a motor 21 and a plunger pump 11. In some embodiments, the pumping system 90a further includes a machine control system 901. In some embodiments, a power unit control system 401 is further provided in the power unit 40. The power distribution control system 761 transmits temperature, voltage, current, alarm information or the like to the power unit control system 401, and the power unit control system 401 transmits a control signal such as a switch control signal to the power distribution control system 761.

Except for the machine control system 901 and the power unit control system 401, other configurations of the pumping system 90a are the same as those in the pumping system 90 shown in FIG. 2C, and repeated description is omitted here. As can be seen from FIG. 7A, in the pumping system 90a, the rectifier unit 50 of the power unit 40 is placed in the power distribution unit 76, and the inverter units 70 of the power unit 40 may be integrated on the motor 21. In this way, not only the space occupied by the whole machine layout can be reduced, but also a balanced distribution of weight and space is taken into account.

According to the above configuration, the power (such as three-phase power) provided by the power supply source 75 may be directly supplied to the power distribution unit 76, then is distributed to the rectifier unit 50 of the power unit 40 in the pumping system 90a via the power distribution unit 76 (after its voltage being adjusted by the power distribution unit 76 or without being adjusted by the power distribution unit 76), and then is supplied to the inverter units 70 to drive the motor 21. The power distribution unit 76 also supplies power to other auxiliary devices (such as control system, etc.) in the pumping system 90a.

The machine control system 901 of the pumping system 90a can communicate with the power unit control system 401 in the power unit 40, obtain electrical information status on current, voltage or the like of the power unit 40 by receiving an information from the power unit control system 401, and adjust a frequency output of the power unit 40 by issuing a control command to the power unit control system 401 based on the electrical information status, so as to adjust the speed of the motor 21 according to working requirements.

Figure 7B:
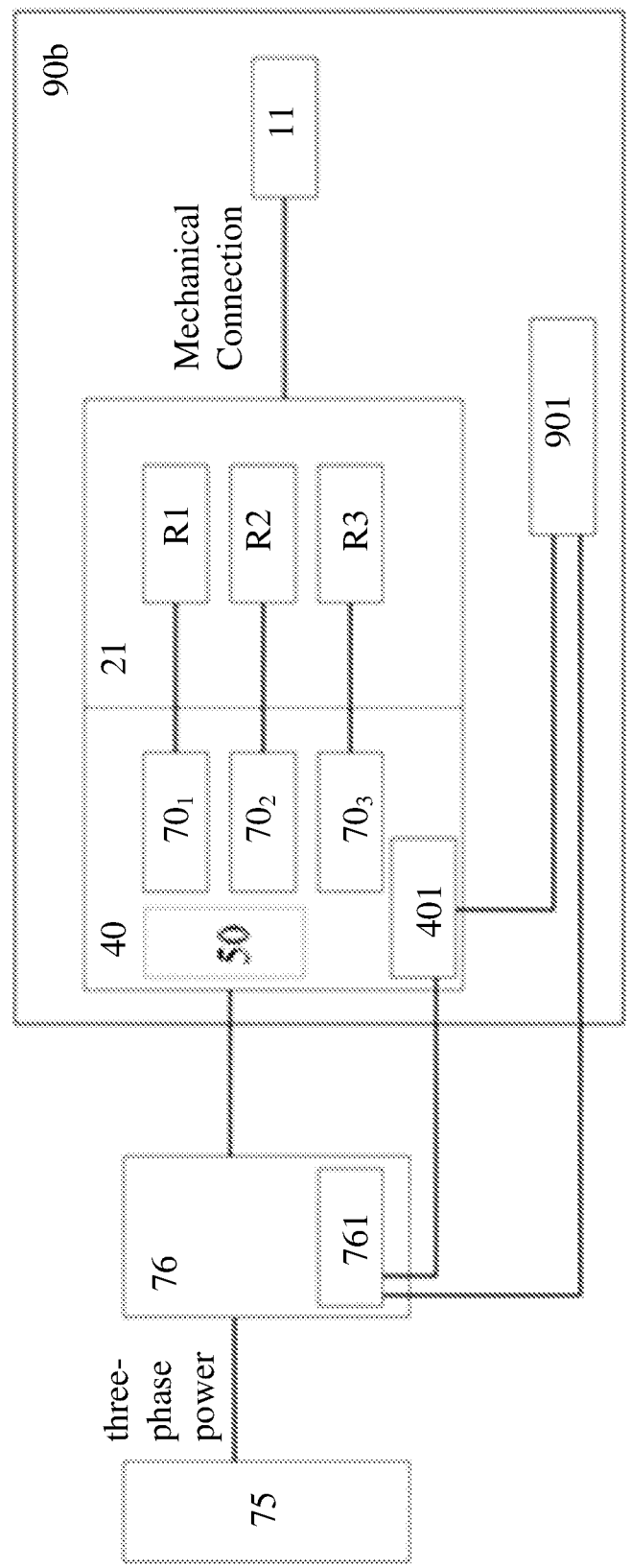
FIG. 7B illustrates a whole machine layout according to an example embodiment, the whole machine layout including the pumping system of the invention and a related power supply system and control system.

FIG. 7B illustrates a second example of a whole machine layout according to a second embodiment, which includes a pumping system 90b, a power distribution unit 76 and a power supply source 75. The difference between the whole machine layout shown in FIG. 7B and that shown in FIG. 7A is that in the pumping system 90b, the rectifier unit 50 of the power unit 40 is placed inside the pumping system 90b and integrated together with the inverter units 70 on the motor 21 (similar to the pumping system 90 shown in FIG. 2A, repeated description is omitted here). Such a whole machine layout can improve the degree of integration and can further reduce the space occupied by the whole machine layout.

Figure 8A:
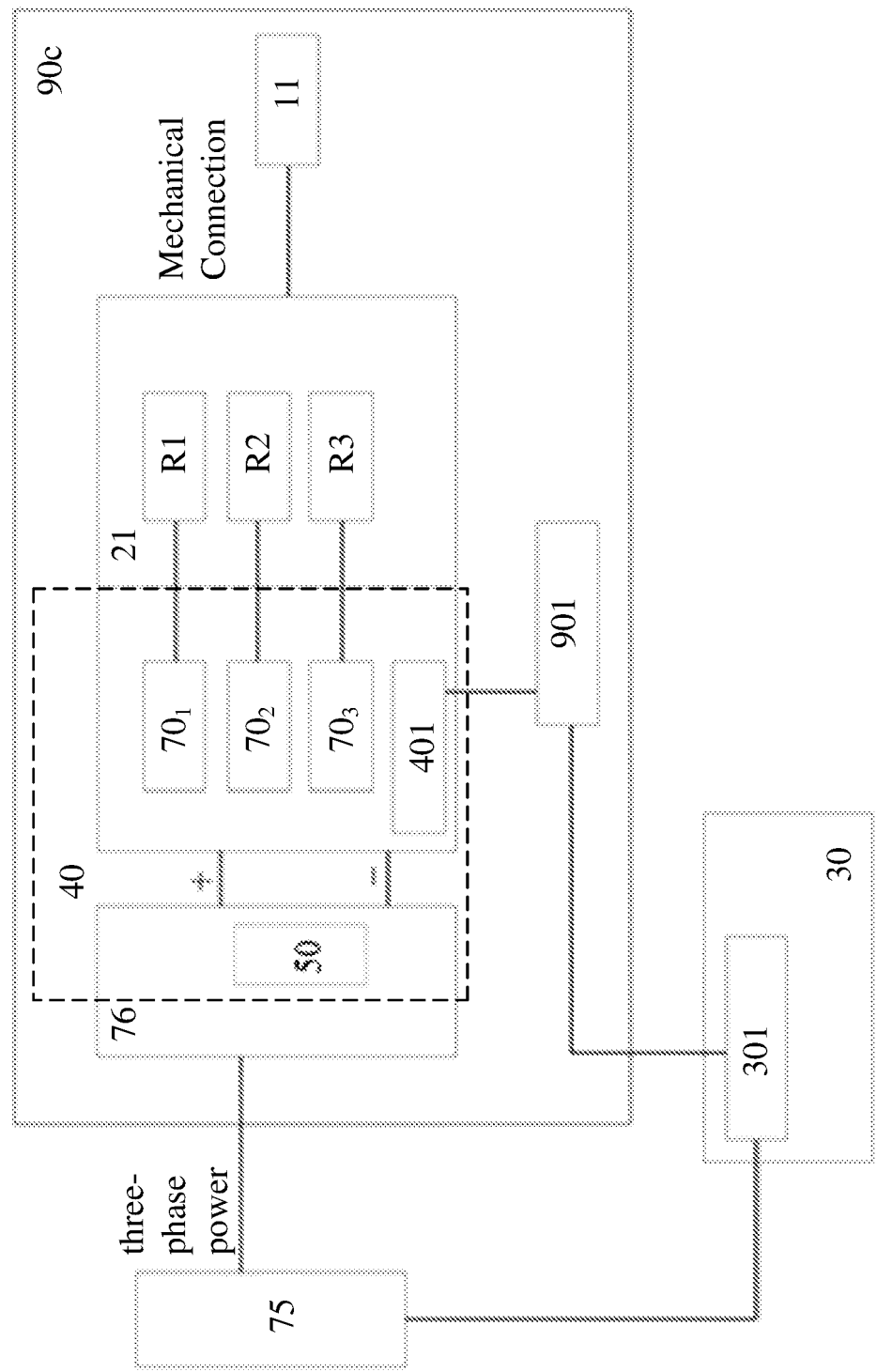
FIG. 8A illustrates a whole machine layout according to an example embodiment, the whole machine layout including the pumping system of the invention and a related power supply system and control system.

FIG. 8A illustrates a third example of a whole machine layout according to a second embodiment, which includes a pumping system 90c, a power distribution unit 76 and a power supply source 75. In some embodiments, the whole machine layout further includes an instrument device 30 in which a centralized control system 301 is arranged. The main difference of FIG. 8A from FIG. 7A is that, on one hand, the power distribution unit 76 is placed inside the pumping system 90c; On the other hand, the machine control system 901 in the pumping system 90c is electrically connected to the centralized control system 301 in the instrument device 30 in addition to being electrically connected to the power unit control system 401 in the power unit 40. The centralized control system 301 performs a remote control of the pumping system 90c and/or the power supply source 75. As an example, the power supply source 75 is for example a generator. In this case, a shutdown of the generator for an emergent event can be realized through the centralized control system 301.

Figure 8B:
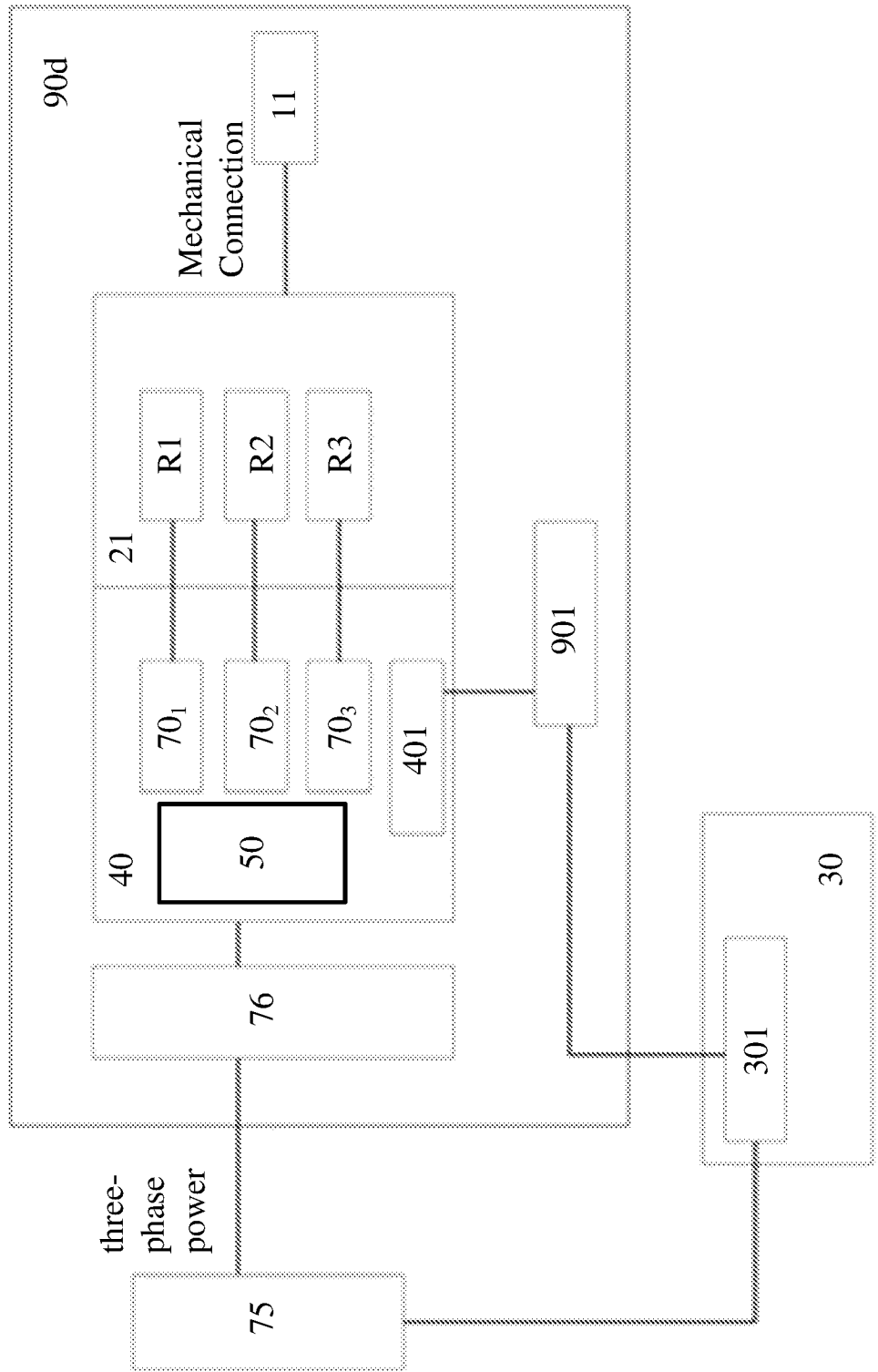
FIG. 8B illustrates a whole machine layout according to an example embodiment, the whole machine layout including the pumping system of the invention and a related power supply system and control system.

FIG. 8B illustrates a fourth example of a whole machine layout according to a second embodiment. The main difference of FIG. 8B from FIG. 8A is that the rectifier unit 50 in the power unit 40 is integrated together with the inverter units 70 on the motor 21. Repeated description will be omitted.

The whole machine layout may be a layout of a fracturing device including one of the multi-winding-motor driving system, the variable-frequency electric driving system and the pumping system. The number of components in the whole machine layout is not limited to those shown in FIGS. 7A to 7B and FIGS. 8A to 8B. For example, according to the whole machine layout shown in FIGS. 7A to 8B, since the multi-winding-motor 21 is integrated with at least part of the power unit 40 so as to make the structure more compact, the whole machine layout of one fracturing device or another wellsite equipment may be a case in which two motors are arranged to drive corresponding two plunger pumps respectively, or a case in which one motor is arranged to drive two plunger pumps. Note that, in the whole machine layout, it is possible that the motor 21 and the power unit 40 are not integrated.

In addition, the whole machine layout includes one of the multi-winding-motor driving system, the variable-frequency electric driving system and the pumping system, and thus has the advantages thereof. For example, in the whole machine layout shown in FIGS. 7A to 8B, each branch of coil windings of the motor is independently driven by the power unit such that the motor's speed is adjustable, so that it is possible to control an independent operation of different branches of coil windings. Therefore, when a branch fails, other branches in the whole machine layout can still operate.

<3. A Fracturing Device Including a Pumping System>

[3.1 Configuration of a Fracturing Device Integrated by Using a Supporting Frame]

Figure 9:
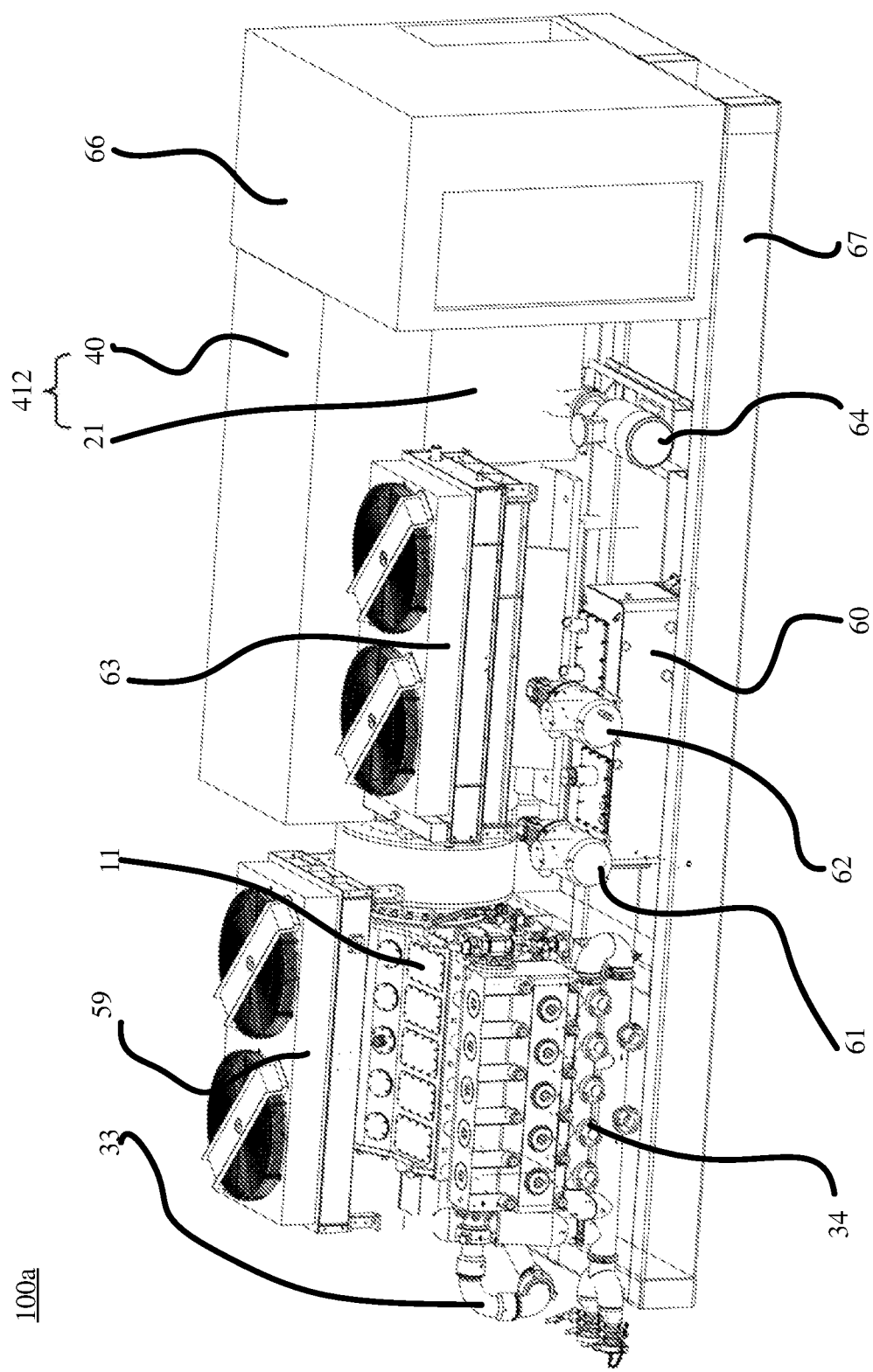
FIG. 9 illustrates a fracturing device being integrated by using a supporting frame, according to an example embodiment.

FIG. 9 illustrates an example of a fracturing device integrated by using a supporting frame according to a third embodiment.

The fracturing device 100a shown in FIG. 9 includes: a supporting frame (such as a sleigh) 67; a high-voltage variable-frequency integrated machine 412 installed on the supporting frame 67; and a plunger pump 11 mounted on the supporting frame 67 and integrally connected to the high-voltage variable-frequency integrated machine 412. The plunger pump 11 is driven by the high-voltage variable-frequency integrated machine 412 to pump the fracturing fluid to the underground.

As mentioned above, the power unit 40 may be integrally installed on the multi-winding-motor 21 or an ordinary motor. In this way, a high-voltage variable-frequency integrated machine 412 in which a high voltage mode, a variable frequency mode and an electric driving mode are integrated is obtained. Specifically, the power unit 40 has a first housing, and the motor 21 has a second housing. The shape of each of the housings may be, for example, a cuboid, a cube, or a cylindrical body such as a cylinder. The embodiment does not specifically limit the shape of the housings. For example, when the shape of the first housing of the power unit 40 and the shape of the second housing of the motor 21 is a cuboid or cube, it is easy to tightly fixing the first housing to the second housing. The first housing may be directly connected to the second housing by bolts, screws, riveting or welding, or may be fixedly connected to the second housing through a mounting flange. The flange may be in a round, square or other shape. A plurality of holes or wiring columns (hereinafter referred to as housing-correlated components) through each of which a cable can penetrate may be arranged in the connection surfaces of the first housing and the second housing. The cable may include a power supply cable for electrically connecting the power unit 40 with the motor 21 to directly output the AC after being regulated in its frequency and/or voltage by the power unit 40 to the motor 21, so as to drive the motor 21 to operate at an adjustable speed.

With the above manner of integration, the output cable of the power unit 40 is located in the housing-correlated components of the power unit 40 and the motor 21, so as to effectively reduce the cable length and reduce the interference.

The power unit 40 may be integrally arranged on the top or a side of the motor 21. Especially when the power unit 40 is integrated on the top of the motor 21, the obtained high-voltage variable-frequency integrated machine 412 greatly saves an installation space, and since the power unit 40 does not need to occupy an independent installation space, the whole device is more compact. It is also possible that the power unit 40 may be partially integrated on the motor 21. In this way, the obtained high-voltage variable-frequency integrated machine 412 can not only reduce the space occupied by the whole machine layout, but also balance the load distribution of the device so as to avoid a local weight concentration or a local excessive size of the device.

As an embodiment, the transmission output shaft of the motor 21 in the high-voltage variable-frequency integrated machine 412 may be directly mechanically connected to the transmission input shaft of the plunger pump 11. For example, they may be connected through splines. For example, the transmission output shaft of the motor 21 may have an internal spline, external spline, plain key or conical key, and the transmission input shaft of the plunger pump 11 may have an external spline, internal spline, plain key or conical key adaptive to the above. The transmission output shaft of the motor 21 may have a housing for protection, and the transmission input shaft of the plunger pump 11 may have a housing for protection. These two housings may be fixedly connected together by using for example screws, bolts, riveting, welding, or flange. For example, the motor 21 may be mechanically connected to a transmission input shaft of the plunger pump 11 (e.g., multi-cylinder plunger pump provided with three cylinders or five cylinders) via a clutch, a coupler or the like, and each branch of coil windings of the motor 21 may be supplied with an adjustable-speed driving by the power unit, so that the motor 21 can output variable speeds, and one motor 21 can drive one or more plunger pumps at the same time.

In FIG. 9, it is assumed that the direction extending horizontally outward along the transmission output shaft of the motor 21 from the high-voltage variable-frequency integrated machine 412 to the plunger pump 11 is X direction, the upward direction perpendicular to the X direction is Y direction, and the direction orthogonal to both the X and Y directions and extending inward perpendicularly to the sheet of FIG. 9 is Z direction. Here, the opposite directions of the X, Y and Z directions are −X, −Y and −Z directions respectively.

As an embodiment, the fracturing device 100a may further include a control cabinet 66. For example, the control cabinet 66 may be arranged on one end of the high-voltage variable-frequency integrated machine 412 in the −X direction or at one end of the plunger pump 11 in the X direction. The invention does not limit the specific position of the control cabinet 66 with respect to the high-voltage variable-frequency integrated machine 412 and the plunger pump 11, as long as their layout can make the fracturing device 100a highly integrated. For example, the control cabinet 66 may be any of the power distribution unit 76 shown in FIGS. 7A to 8B. When the control cabinet includes parts of the power unit 40 that are not integrated on the motor 21, not only the space occupied by the whole machine layout can be reduced, but also the load distribution of the device can be balanced so as to avoid a local weight concentration or a local excessive size of the device. For example, a high-voltage switch cabinet and an auxiliary transformer can further be integrally installed in the control cabinet 66. As an example, the auxiliary transformer can output a low voltage of 300V~500V (AC) so as to supply power to auxiliary electrical devices such as a lubrication system, a cooling system and the like in the fracturing device 100a.

As an embodiment, a feeding manifold 34 may be arranged on one side of the plunger pump 11 in the Z direction or −Z direction, to supply fracturing fluid to a supplying port of a hydraulic end of the plunger pump 11. A discharging manifold 33 may be arranged on one end or both ends of the plunger pump 11 in the X direction and/or −X direction, to discharge the fracturing fluid from a discharging port of the hydraulic end of the plunger pump 11. The fracturing fluid from the feeding manifold 34 enters the inside of the plunger pump 11 through the supplying port of the hydraulic end of the plunger pump 11, is pressurized by the movement of the plunger pump 11, and then is discharged through the discharging port of the hydraulic end of the plunger pump 11 and is delivered to the outside of the plunger pump 11 via the discharging manifold 33.

As some embodiments, the fracturing device 100a may further include one or more of the following: a lubrication system; a lubricating oil cooling system; and a coolant cooling system. For example, the lubrication system includes: a lubricating oil tank 60; a first lubrication motor and lubrication pump group 61; and a second lubrication motor and lubrication pump group 62, etc. For example, different lubrication pumps may be provided according to different positions for lubrication to meet different lubrication requirements of pressure, flow rate and oil quality. For example, the lubricating oil cooling system includes a lubricating oil radiator 59 and the like to cool the lubricating oil. For example, the coolant cooling system includes: a coolant radiator 63; and a coolant motor and coolant pump group 64, etc.

For example, each of the above cooling systems may include a radiator and a heat dissipation fan for performing a heat exchange between a liquid and the air, and the heat dissipation fan is driven by a heat dissipation motor. For example, the high-voltage variable-frequency integrated machine 412 of the fracturing device 100a can be cooled by an air cooling system. At this time, it is necessary to use a heat dissipation fan to dissipate heat for each branch and a bearing of the motor. In some embodiments, the high-voltage variable-frequency integrated machine 412 of the fracturing device 100a can adopt a cooling system by combining air cooling and coolant cooling. Each of the above cooling systems may be integrally arranged on the top or a side of the plunger pump 11, or at the top or a side of the high-voltage variable-frequency integrated machine 412, so as to provide a sufficient cooling capacity and allow a high degree of integration of the whole machine layout of the fracturing device 100a.

In the high-voltage variable-frequency integrated machine 412 of the fracturing device 100a, since the multi-winding-motor 21 is adopted, and each branch of the motor 21 is independently driven by using the power unit. Therefore, even if one branch of working structure fails, the fracturing device 100a can continue to work. In addition, since the whole fracturing device 100a adopts the high-voltage variable-frequency integrated machine 412 obtained by integrating at least a part of the power unit 40 in the previous embodiment with the multi-winding-motor 21, not only the high degree of integration of the whole device on the supporting frame can be realized, but also the whole device can be directly electrically connected to a power supply facility without a transformer.

[3.2 Configuration of a Fracturing Device Integrated by Using a Semi-Trailer]

Figure 10:
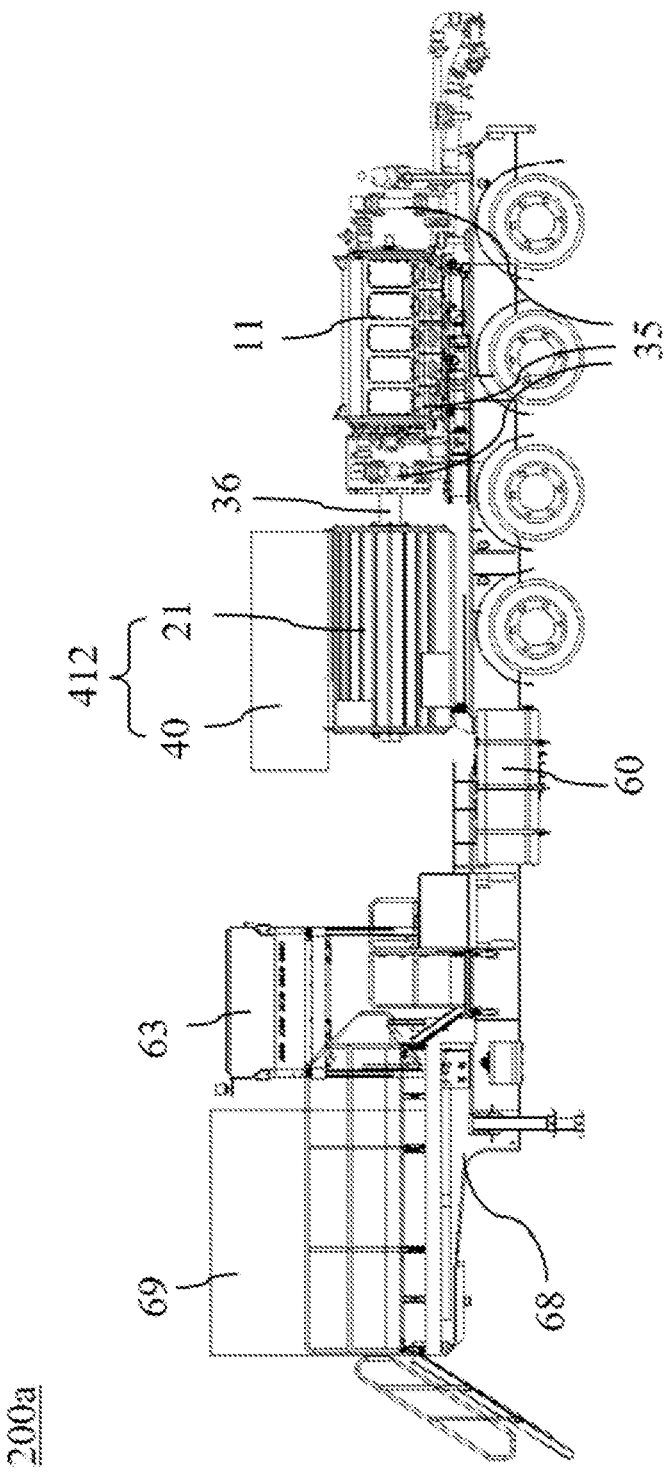
FIG. 10 illustrates a fracturing device being integrated by using a semi-trailer, according to an example embodiment.

FIG. 10 illustrates an example of a fracturing device integrated by a semi-trailer according to a third embodiment. FIG. 11 illustrates another example of a fracturing device integrated by a semi-trailer according to a third embodiment. In the examples of the fracturing devices 200a and 300a shown in FIGS. 10 and 11, a high-voltage variable-frequency integrated machine 412 and a plunger pump 11 are integrally installed on the semi-trailer 68. The high-voltage variable-frequency integrated machine 412 is integrally composed of at least a part of the power unit 40 and the multi-winding-motor 21. FIG. 10 illustrates an example in which one high-voltage variable-frequency integrated machine 412 drives one plunger pump 11. For example, at least two sets of a structure including single motor and single pump may be provided on one integrated fracturing device. In addition, FIG. 11 illustrates an example in which one high-voltage variable-frequency integrated machine 412 drives multiple (for example, two) plunger pumps 11.

As some embodiments, the fracturing device 200*a* and 300*a* each may further include one or more of the following: a power distribution cabinet 69, a radiator 63, a connection part 36, manifolds 35 (such as a feeding manifold and a discharging manifold), and a lubricating oil tank 60, etc. The fracturing devices 200*a* and 300*a* each may further include motor and pump groups in cooperation with each of the radiator 63 and the lubricating oil tank 60. For details, please refer to the lubrication system, lubricating oil cooling system and coolant cooling system described above. The connection part 36 is used to realize the mechanical connection between the high-voltage variable-frequency integrated machine 412 and the plunger pump 11. For example, the power distribution cabinet 69 may be any of the power distribution units 76 shown in FIGS. 7A to 8B. When the power distribution cabinet 69 accommodates the parts of the power unit 40 that are not integrated on the motor 21, not only the space occupied by the whole machine layout can be reduced, but also the load distribution of the device can be balanced so as to avoid a local weight concentration or a local excessive size of the device.

Except for the above integration by using a supporting frame (such as a sleigh) or semi-trailer, the integration in a vehicle-mounted manner may also be considered.

<4. Examples of a Pumping Device and a Cementing Device>

Figure 11:
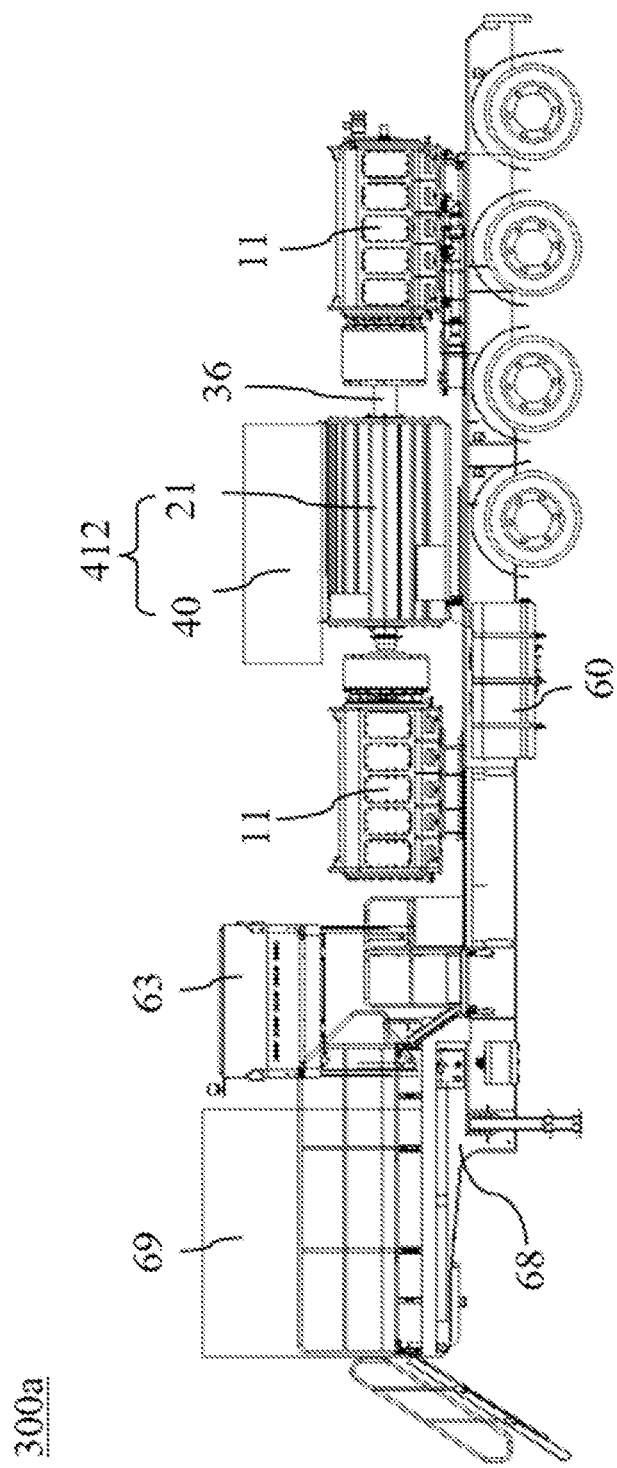
FIG. 11 illustrates a fracturing device integrated by using a semi-trailer, according to an example embodiment.

The fracturing device is described as an example with reference to FIGS. 9 to 11 previously. The working fluid of the fracturing device is fracturing fluid. The fracturing fluid may be supplied to the supplying port of the hydraulic end of the plunger pump 11 of the fracturing device via the feeding manifold 34. After being pressurized by the plunger pump 11, the fracturing fluid is discharged to the discharging manifold 33 through the discharging port of the hydraulic end of the plunger pump 11, and is delivered to the underground via the discharging manifold 33 so as to fracture the formation.

For example, the fracturing device may be replaced with a pumping device which includes the pumping system. At this time, the working fluid is pumping fluid. The pumping fluid may be supplied to the supplying port of the hydraulic end of the plunger pump 11 of the pumping device via the feeding manifold 34. After being pressurized by the plunger pump 11, the pumping fluid is discharged to the discharging manifold 33 through the discharging port of the hydraulic end of the plunger pump 11 and is delivered to a well via the discharging manifold 33 so as to pump some downhole tools.

For example, the fracturing device may be replaced with a cementing device which includes the pumping system. In the cementing device, the working fluid is cement slurry. The cement slurry may be supplied to the supplying port of the hydraulic end of the plunger pump 11 of the cementing device via the feeding manifold 34. After being pressurized by the plunger pump 11, the cement slurry is discharged to the discharging manifold 33 through the discharging port of the hydraulic end of the plunger pump 11, and is delivered to a well via the discharging manifold 33 so as to fix the well's wall (wellbore).

<5. Example of Wellsite Equipment>

The wellsite equipment may include at least one fracturing device or at least one pumping device or at least one cementing device or any combination thereof.

For example, in wellsite equipment, multiple fracturing devices may be included. These fracturing devices may share one discharging manifold 33. The shared discharging manifold 33 and the feeding manifolds 34 for the fracturing devices may be integrated on a manifold sleigh.

In some examples, the above wellsite equipment often further includes a control room in which a centralized control system is provided to control all fracturing devices, etc.

For example, the wellsite equipment may further include a fluid preparation area. The fluid preparation area may include liquid mixing and supplying equipment, sand mixing equipment, a liquid tank, sand storing and adding equipment, etc. In some cases, for example, the fracturing fluid injected into the well is a sand-carrying liquid, which needs to mix water, sand and chemical additives to make the sand suspend in the fracturing fluid. For example, water from the liquid tank and chemical additives may be supplied to the liquid mixing and supplying equipment and be mixed herein to form a mixed liquid. The mixed liquid from the liquid mixing and supplying equipment and sand from the sand storing and adding equipment are supplied into the sand mixing equipment and are mixed to form a sand-carrying fracturing fluid required in the operation. The fracturing fluid having a low pressure formed by the sand mixing equipment is transported to the supplying port of the hydraulic end of the plunger pump of each fracturing device via corresponding one feeding manifold 34. The fracturing fluid is pressurized by the plunger pump and is transported to the discharging port of the hydraulic end, and then the fracturing fluid having a high pressure is discharged via the discharging manifold 33.

<6. Example 1 of a Control Method of a Multi-Winding-Motor>

Since the pumping system has a large fluctuation of power in actual use, some inverting unit(s) among the plurality of inverter units may be selectively turned off, the number of inverting unit(s) being in a working state among the plurality of inverter units or the motor's rotation speed may be selectively adjusted. Specifically, for example, in the pumping system 90*a* shown in FIG. 7A, the power unit control system 401 in the power unit 40 may detect information on a current, a voltage outputted from the power unit 40 or the like. When the outputted current or voltage is lower than a predetermined value for a period of time, some inverting unit(s) may be selectively turned off, therefore some branch(es) of the multi-branch windings of the motor may be powered off. In this way, the overall efficiency of the pumping system can be improved, and a power loss due to resistance, heating or the like can be reduced. The specific description of such a control method is as follows.

In the pumping system 90*a*, a PLC (programmable logic controller) is provided in the machine control system 901. The PLC may perform a determination process by obtaining the total output power of the inverter units $70_1 \sim 70_n$ in the power unit 40 from the power unit control system 401 in the power unit 40, even though the PLC can also perform a determination process by using a current flowing through a bus line. The following example relates to a case in which a determination process is performed according to the output power, and in this example, the PLC compares the currently obtained total output power of the inverter units $70_1 \sim 70_n$ with the rated power P of the motor 21.

Figure 12:
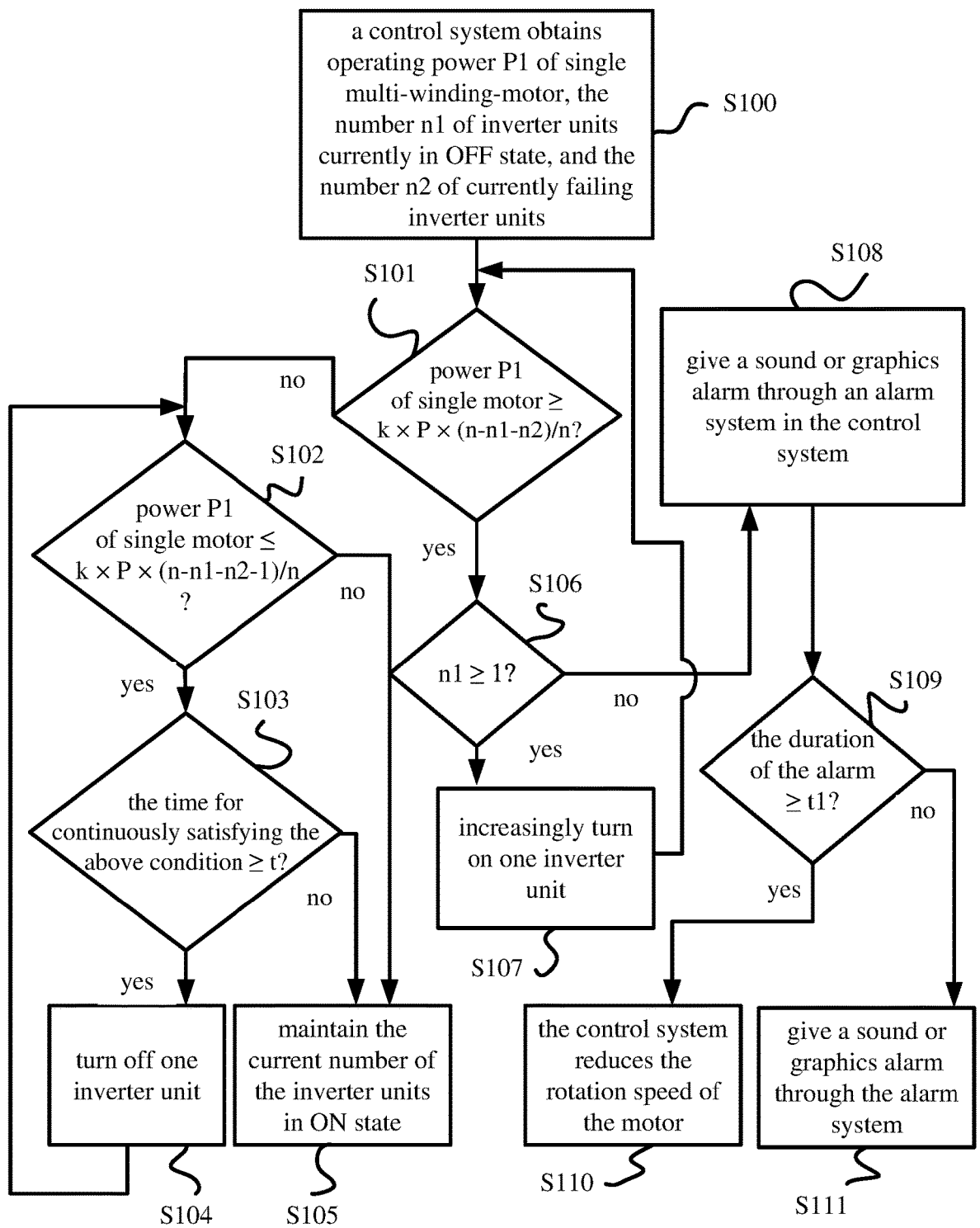
FIG. 12 illustrates a flowchart fora method of controlling the multi-winding-motor driving system according to an example embodiment.

Specifically, a control method shown in FIG. 12 (steps S100 to S108) may be adopted to make a determination so as to implement a control, in this figure, k is the safety factor of the motor and k<1, P is the rated power of the motor 21, n is the number of the plurality of inverter units 70 contained in each power unit 40, t1 is an alarm duration predetermined by the user and t1 usually does not exceed a overpower operation time for which the power unit 40 or the motor 21 is allowed to operate, and t is a predetermined time set by the user.

First, in step S100, the power unit control system 401 obtains the actual operating power P1 of a single multi-winding-motor 21 (or the output power P1 of the single motor), the number n1 of inverter units currently being in OFF state, and the number n2 of currently failed (e.g., damaged) inverter units, and the PLC in the machine control system 901 receives these information obtained by the power unit control system 401.

Then, based on the received information as above, the PLC determines whether the output power P1 of the single motor is no less than $k \times P \times (n-n1-n2)/n$ (please refer to step S101). When the determination result is "yes", the process proceeds to step S106. When the determination result is "no", the process proceeds to step S102.

In step S102, the PLC determines whether the output power P1 of the single motor is no larger than $k \times P \times (n-n1-n2-1)/n$. When the determination result is "yes", the process proceeds to step S103. When the determination result is "no", the process proceeds to step S105. In step S105, the machine control system 901 instructs the power unit control system 401 to maintain the current number of the inverter units in working state (i.e., $n-n1-n2$).

In step S103, the PLC determines whether the time for continuously satisfying the above condition in step S102 is no less than the predetermined time t. When the determination result is "no", the process also proceeds to step S105, that is, maintaining the current number of inverter units in working state. When the determination result is "yes", the machine control system 901 instructs the power unit control system 401 to turn off one inverting unit (please refer to step S104). After step S104, repeat step S102 and subsequent steps.

In step S106, if the PLC determines that the number n1 of inverter units currently being in OFF state is no less than 1, the machine control system 901 instructs the power unit control system 401 to increasingly turn on one inverting unit (please refer to step S107). After step S107, repeat step S101 and subsequent steps. In addition, in step S106, if the PLC determines that the number n1 of inverter units currently being in OFF state is less than 1, the machine control system 901 gives an alarm information (please refer to step S108).

Thus, according to the total output power of the power unit, the invention can selectively turn off a part of the plurality of inverter units or adjust the number of inverter units in working state among the plurality of inverter units.

<7. Example 2 of a Control Method of a Multi-Winding-Motor>

The n-branch windings of the motor 21 are respectively supplied with a variable-frequency current (output voltage or current) from the corresponding inverter units of the power unit. When one branch of the windings has a failure or the corresponding one inverting unit has a failure, other inverter units can still work normally, and other branches of windings of the motor can still operate, but the total operating power will be lower than the rated power by 1/n. At this time, the machine control system can give an alarm information (such as a graphics, color, text, sound information or the like) on a display interface to indicate that a part of the power unit 40 or the windings of the motor 21 of the motor has a failure. Specifically, for example, as shown in FIG. 7A, if a part of the power unit 40 or the windings of the motor 21 fails, a fault information on power unit and the like will be transmitted to the power unit control system 401 of the power unit 40 along with a voltage or current information, and the power unit control system 401 will transmit the fault information to the machine control system 901 of the pumping system 90a. Then, according to the number of failed inverter units or the number of failed windings of the motor contained in the fault information on the power unit and the like, the machine control system 901 reduces the pumping capacity of the pumping system 90a, and thus reduces its actual usage power, so as to limit the output power of the motor 21 to make it lower than the safety value of the current maximum operation capacity (for example, if one branch of windings is damaged, the operation power of the motor will be reduced from the rated power by 1/n, therefore, the total output power of the plurality of inverter units is limited such that the output power of the motor does not exceed the safety limit value $k \times (P-(1/n) \times P)$, where P is the rated power of the motor 21, k is the safety factor of the motor and k<1, and n is the branch number of the multi-branch windings of the motor), which makes it below the above safety limit value. Thus, the pumping system 90a can improve safety and stability, reduce cost loss and improve cost economy.

Specifically referring to FIG. 12, steps S100, S101 and S106 are the same as the above, and the repeated description is omitted here. In the above step S106, if the PLC determines that the number n1 of inverter units currently being in OFF state is less than 1, the machine control system 901 gives an alarm information (such as a graphics, color, text, sound information or the like) through an alarm system provided in the machine control system (please refer to step S108). The alarm system may be a display system or a voice system.

Next, the time period for which the above alarm continues is compared with the alarm duration t1 predetermined by the user (please refer to step S109). If the time period for which the above alarm continues is equal to or longer than the predetermined alarm duration t1, the machine control system 901 instructs the power unit control system 401 to reduce the rotation speed of the motor (please refer to step S110). If the time period for which the above alarm continues is shorter than the predetermined alarm duration t1, an alarm given through the alarm system continues (please refer to step S111).

The devices or components in various embodiments or examples may be combined with each other or replaced as needed, rather than limited to the specific examples described above.

Those skilled in the art should understand that, according to the design requirements and other factors, various deformations, combinations, sub combinations and changes may be conceived, which fall within the scope of the appended claims and their equivalents.

What is claimed is:

1. A multi-winding-motor driving system, comprising:
   a motor having multi-branch windings independent from each other; and
   a power unit including at least one rectifier unit and a plurality of inverter units, wherein the inverter units correspond to the multi-branch windings of the motor one to one, and each of the inverter units supplies power to a corresponding one branch of the multi-branch windings of the motor;

wherein the at least one rectifier unit consists of a single rectifier unit, and is shared by and electrically connected to the plurality of inverter units, and the plurality of inverter units are connected in series, in parallel, or in a series-parallel hybrid manner.

2. The multi-winding-motor driving system according to claim 1, wherein the at least one rectifier unit consists of a plurality of rectifier units, and each of the rectifier units is electrically connected to at least one of the plurality of inverter units.

3. The multi-winding-motor driving system according to claim 2, further comprising:

a phase-shifting transformer disposed on an input side of the plurality of rectifier units, wherein the phase-shifting transformer includes one primary winding and a plurality of secondary windings, phases of output voltages of the plurality of secondary windings are shifted at a predetermined interval, and wherein each of the rectifier units is electrically connected to a corresponding one of the plurality of secondary windings of the phase-shifting transformer.

4. The multi-winding-motor driving system according to claim 1, wherein the at least one rectifier unit includes a rectifier circuit, and each of arms of the rectifier circuit includes a plurality of rectifiers connected in series.

5. A pumping system, comprising:

a multi-winding-motor driving system, wherein the multi-winding-motor driving system comprises:

a motor having multi-branch windings independent from each other; and a power unit including a rectifier unit and a plurality of inverter units, wherein the inverter units correspond to the multi-branch windings of the motor one to one, and each of the inverter units supplies power to a corresponding one branch of the multi-branch windings of the motor;

a power distribution unit; and at least one plunger pump, wherein the plunger pump is integrally installed with the multi-winding-motor driving system, and the plunger pump is driven by the motor, wherein a transmission output shaft of the motor is directly mechanically connected to a transmission input shaft of the plunger pump, or wherein the transmission output shaft of the motor is indirectly mechanically connected to the transmission input shaft of the plunger pump through a clutch or a coupler.

6. The pumping system according to claim 5, wherein when the transmission output shaft of the motor is directly mechanically connected to the transmission input shaft of the plunger pump, the transmission output shaft of the motor comprises an internal spline, an external spline, a plain key, or a conical key, and the transmission input shaft of the plunger pump comprises an adaptive external spline, an internal spline, a plain key, or a conical key, and the transmission output shaft of the motor further comprises a first housing, the transmission input shaft of the plunger pump further comprises a second housing, and the first housing and the second housing are fixedly connected through a flange.

7. The pumping system according to claim 5, further comprising:

wherein the power distribution unit disposed inside or outside the pumping system, for supplying power from a power supply source to the power unit of the pumping system.

8. The pumping system according to claim 7, wherein the power unit has a part which is not integrally installed on the motor but is placed in the power distribution unit.

9. The pumping system according to claim 5, wherein the power unit further includes a power unit control system for detecting and controlling a current or a voltage outputted from the power unit, and the pumping system further includes: a machine control system, wherein the machine control system is configured, based on a comparison result between (1) an expected mechanical power outputted from the motor or an expected rotation speed of the motor and (2) an actual mechanical power outputted from the motor or an actual rotation speed of the motor from the power unit control system, to instruct the power unit control system to stop an output of at least part of the inverter units in the power unit, to instruct the power unit control system to adjust a quantity of the inverter units being in a working state, or to instruct the power unit control system to adjust the rotation speed of the motor.

10. The pumping system according to claim 9, wherein the machine control system includes an alarm system, and the machine control system determines whether there is a fault based on information on a voltage or a current transmitted from the power unit control system, and controls the alarm system to provide an alarm based on a result of the determination.

11. A fracturing device, comprising:

the pumping system according to claim 9;

a feeding manifold arranged on one side of the plunger pump in the pumping system;

a discharging manifold arranged on one end or two ends of the plunger pump, wherein working fluid from the feeding manifold is delivered through the discharging manifold after being pressurized by the plunger pump; and a power supply source for supplying power to the fracturing device.

12. The fracturing device according to claim 11, further comprising:

an instrument device comprising a centralized control system for performing a remote control of the pumping system and/or the power supply source.

13. The fracturing device according to claim 11, wherein the fracturing device is installed by using a supporting frame, a sleigh or a semi-trailer, or integrally mounted on a vehicle.

14. Wellsite equipment, comprising:

the fracturing device according to claim 11, wherein the working fluid is fracturing fluid.

15. Wellsite equipment, comprising:

a pumping device including the pumping system according to claim 5;

a feeding manifold arranged on one side of the plunger pump in the pumping system;

a discharging manifold arranged on one end or two ends of the plunger pump, wherein working fluid from the feeding manifold is delivered through the discharging manifold after being pressurized by the plunger pump; and a power supply source for supplying power to the pumping device, wherein the working fluid is pumping fluid.

16. Wellsite equipment, comprising:

a cementing device including the pumping system according to claim 5;

a feeding manifold arranged on one side of the plunger pump in the pumping system;

a discharging manifold arranged on one end or two ends of the plunger pump, wherein working fluid from the feeding manifold is delivered through the discharging manifold after being pressurized by the plunger pump; and a power supply source for supplying power to the cementing device, wherein the working fluid is cement slurry.

17. A variable-frequency electric driving system, comprising:

a motor; and a power unit directly electrically connected to a power supply system and driving the motor, wherein the power unit includes: a rectifier unit directly electrically connected to the power supply system; and an inverting unit electrically connected to the rectifier unit and driving the motor, and wherein the rectifier unit uses a three-phase rectifying circuit, each of an upper arm and a lower arm of each phase of the three-phase rectifying circuit includes a rectifier module, and the rectifier module includes a plurality of rectifiers connected in series.

18. The variable-frequency electric driving system according to claim 17, wherein the inverting unit consists of a plurality of inverter units, and the plurality of inverter units are connected in series, in parallel, or in a series-parallel hybrid manner, and wherein the motor consists of a plurality of motors, and the motors correspond to the inverter units one to one, or the motor is provided with multi-branch windings independent from each other, and the multi-branch windings correspond to the inverter units one to one.

19. The variable-frequency electric driving system according to claim 17, wherein the inverting unit is integrally installed on the motor.

* * * * *